United States Patent
Ohta

(10) Patent No.: US 11,089,290 B2
(45) Date of Patent: Aug. 10, 2021

(54) STORAGE MEDIUM STORING DISPLAY CONTROL PROGRAM, INFORMATION PROCESSING SYSTEM, AND STORAGE MEDIUM STORING PROGRAM UTILIZED FOR CONTROLLING STEREOSCOPIC DISPLAY

(75) Inventor: Keizo Ohta, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 934 days.

(21) Appl. No.: 12/938,089

(22) Filed: Nov. 2, 2010

(65) Prior Publication Data

US 2011/0102425 A1 May 5, 2011

(30) Foreign Application Priority Data

Nov. 4, 2009 (JP) .............................. JP2009-253234
Oct. 25, 2010 (JP) .............................. JP2010-238665

(51) Int. Cl.
*G06T 15/08* (2011.01)
*G06T 15/30* (2011.01)
(Continued)

(52) U.S. Cl.
CPC ........... *H04N 13/359* (2018.05); *G06T 15/08* (2013.01); *G06T 15/30* (2013.01); *H04N 13/204* (2018.05);
(Continued)

(58) Field of Classification Search
CPC .......... G06T 15/08; G06T 15/30; H04N 13/02
(Continued)

(56) References Cited

U.S. PATENT DOCUMENTS 5,065,236 A 11/1991 Diner
5,119,189 A 6/1992 Iwamoto et al.
(Continued)

FOREIGN PATENT DOCUMENTS

EP 0563737 10/1993
EP 0 712 110 5/1996
(Continued)

OTHER PUBLICATIONS

U.S. Appl. No. 12/907,248 to Ohta, filed Oct. 19, 2010.
(Continued)

*Primary Examiner* — Jeremiah C Hallenbeck-Huber
(74) *Attorney, Agent, or Firm* — Nixon & Vanderhye, P.C.

(57) ABSTRACT

A display control program includes virtual camera setting instructions for setting respective positions and directions of a right virtual camera and a left virtual camera within a prescribed virtual space used for virtual photographing in the virtual space, and view volume setting instructions for setting respective view volumes of the right virtual camera and the left virtual camera. The view volume setting instructions are adapted to set the view volumes such that both of the view volume of the right virtual camera and the view volume of the left virtual camera include a display target region, which is a region in the virtual space at least to be displayed on a display, and the view volume of at least one virtual camera extends asymmetrically with respect to a line extending from the position of one virtual camera in the camera direction, toward a side where the other virtual camera is present.

26 Claims, 19 Drawing Sheets

(51) Int. Cl.
  *H04N 13/359* (2018.01)
  *H04N 13/275* (2018.01)
  *H04N 13/31* (2018.01)
  *H04N 13/204* (2018.01)
  *H04N 13/282* (2018.01)

(52) U.S. Cl.
  CPC ......... *H04N 13/275* (2018.05); *H04N 13/282* (2018.05); *H04N 13/31* (2018.05)

(58) Field of Classification Search
  USPC .................................. 348/46; 345/419, 620
  See application file for complete search history.

(56) References Cited

U.S. PATENT DOCUMENTS

| | | | |
|---|---|---|---|
| 5,309,522 A | 5/1994 | Dye | |
| 5,510,832 A | 4/1996 | Garcia | |
| 5,682,171 A | 10/1997 | Yokoi | |
| 5,690,551 A | 11/1997 | Taki et al. | |
| 5,726,704 A | 3/1998 | Uomori | |
| 5,734,416 A | 3/1998 | Ito et al. | |
| 5,764,231 A * | 6/1998 | Ray | H04N 1/00201 345/419 |
| 5,808,591 A | 9/1998 | Mantani | |
| 6,005,607 A | 12/1999 | Uomori et al. | |
| 6,034,740 A | 3/2000 | Mitsui et al. | |
| 6,088,006 A * | 7/2000 | Tabata | 345/7 |
| 6,118,475 A | 9/2000 | Iijima et al. | |
| 6,163,337 A | 12/2000 | Azuma et al. | |
| 6,175,379 B1 | 1/2001 | Uomori et al. | |
| 6,198,484 B1 | 3/2001 | Kameyama | |
| 6,236,748 B1 | 5/2001 | Iijima et al. | |
| 6,243,054 B1 | 6/2001 | DeLuca | |
| 6,268,880 B1 | 7/2001 | Uomori et al. | |
| 6,324,001 B2 | 11/2001 | Tabata | |
| 6,384,859 B1 | 5/2002 | Matsumoto et al. | |
| 6,389,179 B1 | 5/2002 | Katayama et al. | |
| 6,559,813 B1 | 5/2003 | DeLuca et al. | |
| 6,559,844 B1 * | 5/2003 | Alamparambil | G06T 15/20 345/427 |
| 6,614,927 B1 | 9/2003 | Tabata | |
| 6,760,020 B1 * | 7/2004 | Uchiyama et al. | 345/419 |
| 6,762,794 B1 | 7/2004 | Ogino | |
| 7,027,664 B2 | 4/2006 | Lee et al. | |
| 7,046,270 B2 | 5/2006 | Murata et al. | |
| 7,236,622 B2 | 6/2007 | Chen et al. | |
| 7,295,697 B1 * | 11/2007 | Satoh | 382/154 |
| 7,417,664 B2 | 8/2008 | Tomita | |
| 7,557,824 B2 | 7/2009 | Holliman | |
| 7,786,997 B2 | 8/2010 | Yoshino et al. | |
| 9,025,007 B1 * | 5/2015 | Parsons | H04N 13/0246 345/419 |
| 2001/0030715 A1 | 10/2001 | Tabata | |
| 2001/0033327 A1 | 10/2001 | Uomori et al. | |
| 2001/0045979 A1 | 11/2001 | Matsumoto et al. | |
| 2002/0030675 A1 | 3/2002 | Kawai | |
| 2002/0126202 A1 | 9/2002 | Wood et al. | |
| 2003/0107643 A1 | 6/2003 | Yoon | |
| 2003/0112503 A1 * | 6/2003 | Lantin | G02B 27/2228 359/376 |
| 2004/0058715 A1 | 3/2004 | Taniguchi et al. | |
| 2004/0066555 A1 * | 4/2004 | Nomura | 359/462 |
| 2005/0089212 A1 * | 4/2005 | Mashitani et al. | 382/154 |
| 2005/0190180 A1 | 9/2005 | Jin et al. | |
| 2005/0253924 A1 * | 11/2005 | Mashitani | 348/42 |
| 2006/0126176 A1 | 6/2006 | Nogami et al. | |
| 2006/0126919 A1 | 6/2006 | Kitaura et al. | |
| 2006/0203085 A1 | 9/2006 | Tomita | |
| 2007/0109296 A1 | 5/2007 | Sakagawa et al. | |
| 2007/0223090 A1 | 9/2007 | Dolgoff | |
| 2007/0242068 A1 | 10/2007 | Han et al. | |
| 2008/0112616 A1 | 5/2008 | Koo et al. | |
| 2008/0246757 A1 | 10/2008 | Ito | |
| 2008/0309660 A1 * | 12/2008 | Bertolami | A63F 13/10 345/419 |
| 2009/0103833 A1 | 4/2009 | Mitsuhashi et al. | |
| 2009/0160934 A1 * | 6/2009 | Hendrickson | H04N 13/0239 348/47 |
| 2009/0219283 A1 * | 9/2009 | Hendrickson | H04N 13/0022 345/420 |
| 2010/0053310 A1 | 3/2010 | Maxson et al. | |
| 2010/0289882 A1 | 11/2010 | Ohta | |
| 2010/0328428 A1 * | 12/2010 | Booth et al. | 348/46 |
| 2011/0032252 A1 | 2/2011 | Ohta | |
| 2011/0080401 A1 | 4/2011 | Tan et al. | |
| 2011/0090215 A1 | 4/2011 | Ohta | |
| 2011/0102425 A1 | 5/2011 | Ohta | |
| 2011/0304714 A1 | 12/2011 | Akifusa et al. | |
| 2012/0044249 A1 | 2/2012 | Mashitani et al. | |

FOREIGN PATENT DOCUMENTS

| | | |
|---|---|---|
| EP | 0751689 | 1/1997 |
| EP | 0817125 | 1/1998 |
| EP | 0888017 | 12/1998 |
| EP | 1085769 | 3/2001 |
| EP | 1 089 573 | 4/2001 |
| EP | 1168852 | 1/2002 |
| EP | 1408703 | 4/2004 |
| EP | 1501317 | 1/2005 |
| EP | 1571854 | 9/2005 |
| EP | 2 323 414 | 5/2011 |
| JP | 07-059119 | 3/1995 |
| JP | 07-095621 | 4/1995 |
| JP | 07-143524 | 6/1995 |
| JP | 08-009421 | 1/1996 |
| JP | 08-205201 | 8/1996 |
| JP | 08-331607 | 12/1996 |
| JP | 09-074573 | 3/1997 |
| JP | 09-121370 | 5/1997 |
| JP | 10-074269 | 3/1998 |
| JP | 10-136379 | 5/1998 |
| JP | 11-027703 | 1/1999 |
| JP | 2000-020757 | 1/2000 |
| JP | 2000-078615 | 3/2000 |
| JP | 2001-022344 | 1/2001 |
| JP | 2001-195582 | 7/2001 |
| JP | 2001-326948 | 11/2001 |
| JP | 2003-107603 | 4/2003 |
| JP | 2004-007395 | 1/2004 |
| JP | 2004-007707 | 1/2004 |
| JP | 2004-054590 | 2/2004 |
| JP | 2004-126902 | 4/2004 |
| JP | 2004-519932 | 7/2004 |
| JP | 2004-283303 | 10/2004 |
| JP | 2004-294861 | 10/2004 |
| JP | 2005-058374 | 3/2005 |
| JP | 2005-165614 | 6/2005 |
| JP | 2005-353047 | 12/2005 |
| JP | 2007-044244 | 2/2007 |
| JP | 2007-286623 | 11/2007 |
| JP | 2008-287588 | 11/2008 |
| JP | 2009-064356 | 3/2009 |
| WO | 01/84852 | 11/2001 |
| WO | 02/073981 | 9/2002 |
| WO | 2007/148434 | 12/2007 |

OTHER PUBLICATIONS

U.S. Appl. No. 12/845,970 to Ohta, filed Jul. 29, 2010.
U.S. Appl. No. 12/779,421 to Ohta, filed May 13, 2010.
Notice of Grounds of Rejection for Japanese Application No. 238665/2010, dated Feb. 1, 2011.
Japanese Accelerated Examination Support Document, dated Dec. 22, 2010.
European Search Report for EPO application EP10 18 8033, dated May 4, 2011.
European Search Report for EPO application EP 10 18 9834, dated Jun. 7, 2011.
Oct. 1, 2012 Office Action from U.S. Appl. No. 12/779,421, 27, pages.

(56) References Cited

OTHER PUBLICATIONS

English-language machine translation of JP 10-136379.
English-language machine translation of JP 11-027703.
English-language machine translation of JP 2001-195582.
Ohta, U.S. Appl. No. 12/779,421, filed May 13, 2010, notice of appeal filed Oct. 24, 2013.
Ohta, U.S. Appl. No. 12/845,970, filed Jul. 29, 2010, final office action dated Sep. 13, 2013.
Ohta, U.S. Appl. No. 12/907,248, filed Oct. 19, 2010, response to office action filed Oct. 21, 2013.
English-language machine translation of JP 2004-283303.
English-language machine translation of JP 2007-044244.
English-language machine translation of JP 2005-165614.
English-language machine translation of JP 9-074573.
English-language machine translation of JP 8-331607.
Office Action dated Dec. 31, 2014 in U.S. Appl. No. 12/779,421.

* cited by examiner

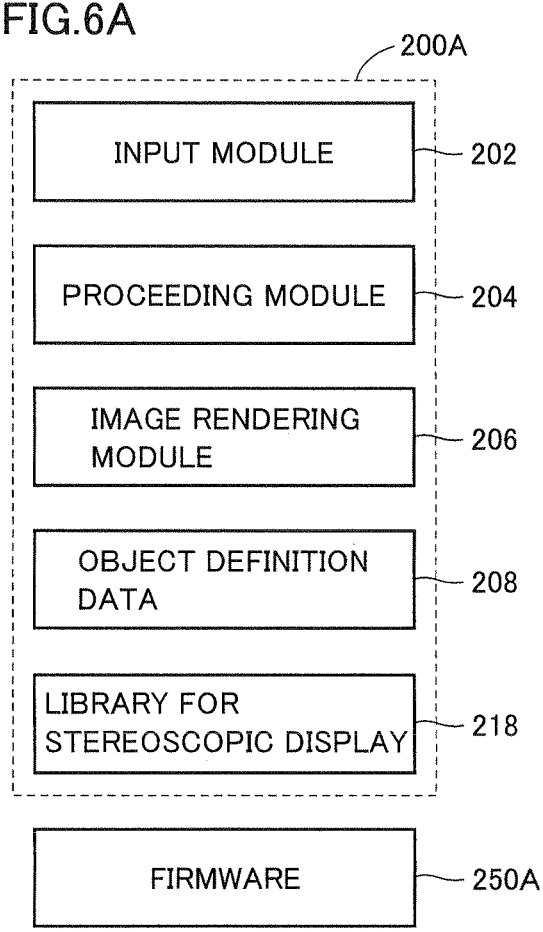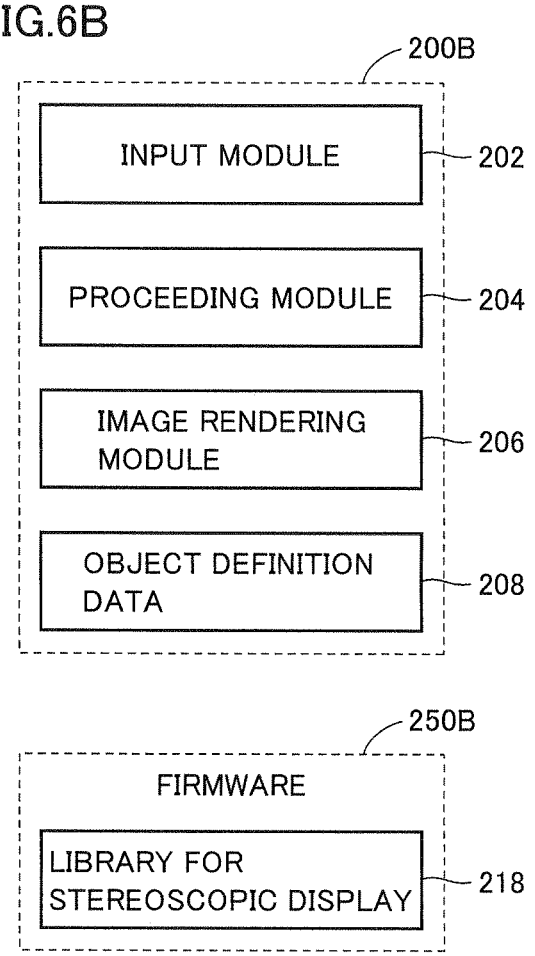

FIG.7

(1) REFERENCE VIRTUAL CAMERA INFORMATION
 — PROJECTION MATRIX
 — VIEW MATRIX
(2) REFERENCE VIRTUAL PLANE INFORMATION
(3) PARALLAX ASSESSMENT PLANE INFORMATION
/ (3') REFERENCE DEGREE OF STEREOSCOPIC EFFECT
(4) MODE INFORMATION

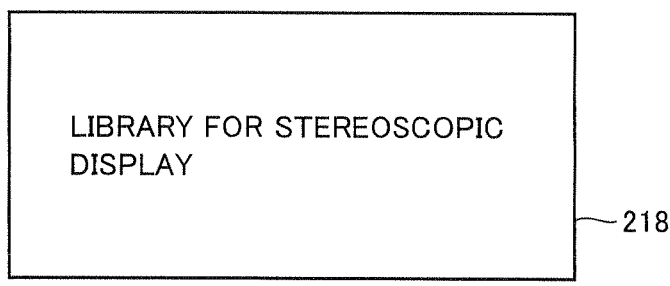

LIBRARY FOR STEREOSCOPIC DISPLAY ~218

(5) RIGHT VIRTUAL CAMERA INFORMATION
 — PROJECTION MATRIX
 — VIEW MATRIX
(6) LEFT VIRTUAL CAMERA INFORMATION
 — PROJECTION MATRIX
 — VIEW MATRIX
(7) DISTANCE BETWEEN VIRTUAL CAMERAS (RATIO)

FIG.11
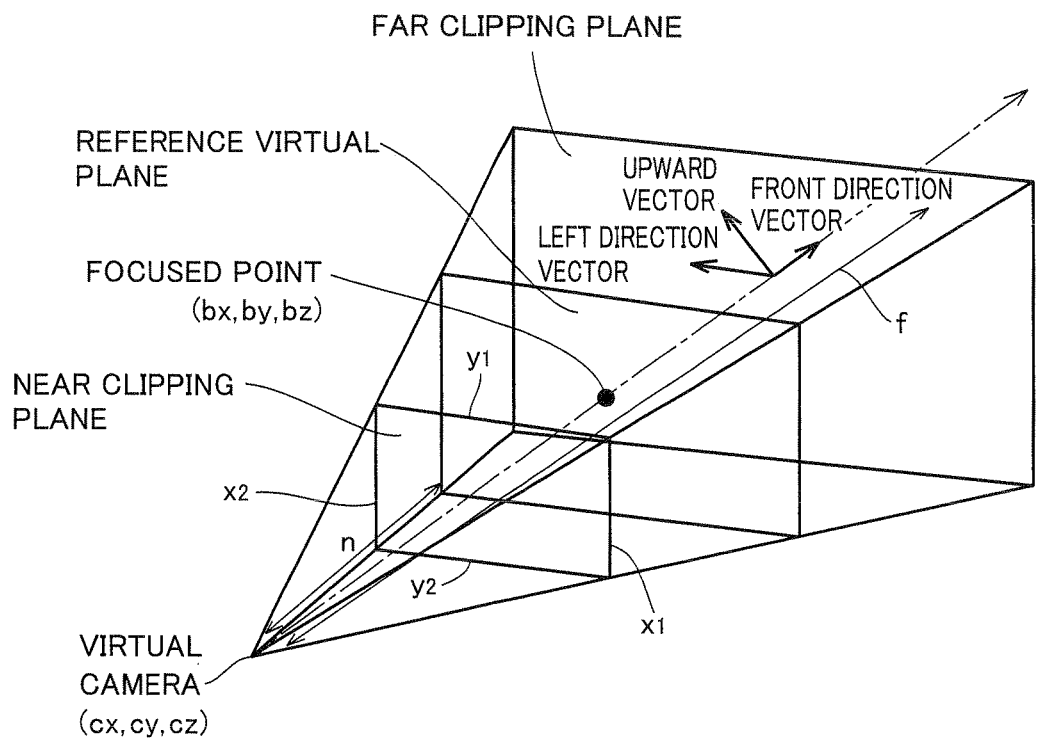
CAMERA COORDINATE SYSTEM
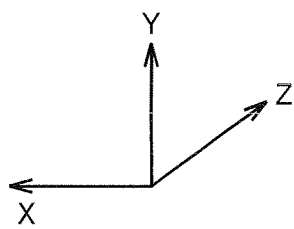

FIG.20

(1) REFERENCE VIRTUAL CAMERA INFORMATION
— PROJECTION MATRIX
— VIEW MATRIX
(2) REFERENCE VIRTUAL PLANE INFORMATION
(null) / (3') REFERENCE DEGREE OF STEREOSCOPIC EFFECT
(4) MODE INFORMATION

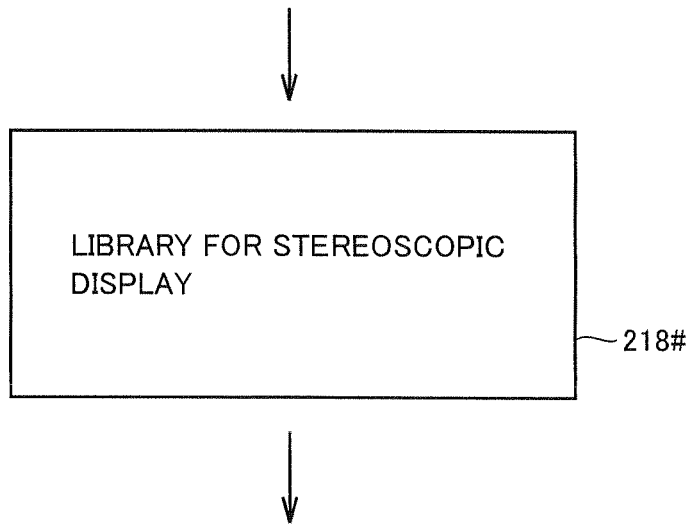

LIBRARY FOR STEREOSCOPIC DISPLAY — 218#

(5) RIGHT VIRTUAL CAMERA INFORMATION
— PROJECTION MATRIX
— VIEW MATRIX
(6) LEFT VIRTUAL CAMERA INFORMATION
— PROJECTION MATRIX
— VIEW MATRIX
(7) DISTANCE BETWEEN VIRTUAL CAMERAS (RATIO)

STORAGE MEDIUM STORING DISPLAY CONTROL PROGRAM, INFORMATION PROCESSING SYSTEM, AND STORAGE MEDIUM STORING PROGRAM UTILIZED FOR CONTROLLING STEREOSCOPIC DISPLAY

This nonprovisional application is based on Japanese Patent Applications Nos. 2009-253234 and 2010-238665 filed with the Japan Patent Office on Nov. 4, 2009 and Oct. 25, 2010, respectively, the entire contents of which are hereby incorporated by reference.

BACKGROUND OF THE INVENTION

Field of the Invention

The present invention relates to a storage medium storing a display control program used in providing stereoscopic display using two images on a display capable of providing stereoscopic display and an information processing system as well as a storage medium storing a program directed thereto.

Description of the Background Art

A method for providing stereoscopic display using two images having prescribed parallax has conventionally been known. Such stereoscopic display has increasing fields of applications. For example, applications for displaying a three-dimensional virtual space, such as a game and CG animation, have been developed.

In such an application, stereoscopic display is carried out by setting two virtual cameras within a three-dimensional virtual space and using images including a subject such as an object obtained by virtually photographing the subject with respective virtual cameras. For stereoscopic display easily viewable by a user, the two virtual cameras should appropriately be set. For example, Japanese Patent Laying-Open No. 2003-107603 discloses a method of generating images for stereoscopic display such that a portion to which attention is desirably paid is focused.

In providing stereoscopic display on a display as described above, images obtained by photographing by two virtual cameras respectively should be superimposed on each other and then displayed. According to the method disclosed in Japanese Patent Laying-Open No. 2003-107603, the respective virtual cameras are arranged at different positions while setting of their fields of view and the like remains the same. With this method, there is a portion which is not superimposed, between the images rendered (output) by the respective virtual cameras. Therefore, an image covering a range wider than a range substantially displayed on the display should be rendered and unnecessary and useless processing is disadvantageously caused.

SUMMARY OF THE INVENTION

The present invention was made to solve such problems, and an object of the present invention is to provide a storage medium storing a display control program capable of generating two images used for stereoscopic display with a smaller amount of processing and an information processing system as well as a storage medium storing a program directed thereto.

According to a first aspect of the present invention, a storage medium storing a display control program for controlling a display capable of providing stereoscopic display is provided. The present display control program includes virtual camera setting instructions for setting respective positions and directions of a right virtual camera and a left virtual camera within a prescribed virtual space used for virtual photographing in the virtual space and view volume setting instructions for setting respective view volumes of the right virtual camera and the left virtual camera. The right virtual camera and the left virtual camera serve to generate a right image and a left image used for providing stereoscopic display of an image expressing the virtual space on the display, respectively. The virtual camera setting instructions are adapted such that camera directions of the right virtual camera and the left virtual camera are oriented in an identical direction and the camera direction is perpendicular to a straight line passing through the positions of both of these virtual cameras. The view volume setting instructions are adapted to set the view volumes such that both of the view volumes of the right virtual camera and the left virtual camera include a display target region which is a region in the virtual space at least to be displayed on the display and the view volume of at least one virtual camera extends asymmetrically with respect to a line extending from the position of one virtual camera in the camera direction, toward a side where the other virtual camera is present.

According to the invention of the first aspect, the right virtual camera and the left virtual camera are arranged, such that their camera directions are parallel to each other and a view volume extending asymmetrically toward the side where the other virtual camera is present is set for each virtual camera. Therefore, it is not necessary to generate an (extra) image covering a range not used for stereoscopic display on the display. Thus, unnecessary rendering processing can be suppressed and an amount of processing involved with stereoscopic display processing can be reduced.

According to a preferred second aspect, the virtual camera setting instructions are adapted to set the right virtual camera and the left virtual camera such that the camera directions of the right virtual camera and the left virtual camera are identical to a reference camera direction which is a camera direction of a reference virtual camera, in response to setting of the reference virtual camera within the virtual space. The view volume setting instructions are adapted to set as the display target region, a reference virtual plane region which is included in a view volume of the reference virtual camera and is a region on a prescribed plane perpendicular to the reference camera direction.

According to the invention of the second aspect, by setting the reference virtual camera within the virtual space, a pair of corresponding virtual cameras (a right virtual camera and a left virtual camera) is set. Therefore, a creator or the like of an application including stereoscopic display can obtain a setting value necessary for providing stereoscopic display with workload as much as in the case where an application utilizing only two-dimensional display (that is, not utilizing stereoscopic display) is created. More specifically, a creator or the like of an application can readily obtain a right image and a left image necessary for providing stereoscopic display, with the reference virtual camera serving as a visual point, simply by setting the reference virtual camera such that a display target region (a reference virtual plane region) to desirably be displayed on a display surface of the display is included in the virtual space.

In addition, since an object located on the reference virtual plane region within the virtual space is displayed while it does not have a parallax on the display surface of the display, a user playing the application can recognize the object most easily. In addition, since it is ensured that the range set in the reference virtual plane region is reliably displayed on the display, the creator of an application should only take into account the reference virtual camera and the reference virtual plane region, without taking into account respective arrangement positions and the like of the right virtual camera and the left virtual camera. Thus, creation of an application is facilitated.

According to a further preferred third aspect, the virtual camera setting instructions carry out at least one of setting the right virtual camera at a position resulted from movement of an arrangement position of the reference virtual camera toward the right along a direction perpendicular to the reference camera direction, and setting the left virtual camera at a position resulted from movement of an arrangement position of the reference virtual camera toward the left along the direction perpendicular to the reference camera direction.

According to the invention of the third aspect, since the right virtual camera and/or the left virtual camera is (are) arranged along a direction perpendicular to the camera direction of the reference virtual camera, the right virtual camera and the left virtual camera can be set in a state that positional relation the same as positional relation between the reference virtual camera and the reference virtual plane region is maintained.

According to a further preferred fourth aspect, the virtual camera setting instructions are adapted to set the right virtual camera at the position resulted from movement of the arrangement position of the reference virtual camera toward the right by a prescribed distance along the direction perpendicular to the reference camera direction and to set the left virtual camera at the position resulted from movement of the arrangement position of the reference virtual camera toward the left by the prescribed distance along the direction perpendicular to the reference camera direction.

According to the invention of the fourth aspect, a field of view (view volume) of the right virtual camera and a field of view (view volume) of the left virtual camera are set symmetrically with respect to the camera direction of the reference virtual camera. Stereoscopic display more natural to a user can be provided by using the right image and the left image photographed by the right virtual camera and the left virtual camera thus set, respectively.

According to a preferred fifth aspect, the view volume setting instructions are adapted to set the respective view volumes of the right virtual camera and the left virtual camera such that both of (i) a cross-section at a position corresponding to the reference virtual plane region in the view volume of the right virtual camera and (ii) a cross-section at a position corresponding to the reference virtual plane region in the view volume of the left virtual camera match with a cross-section at a position corresponding to the reference virtual plane region in the view volume of the reference virtual camera.

According to a preferred sixth aspect, the view volume setting instructions include instructions for obtaining a plurality of vertex positions of the reference virtual plane region defining the view volume of the reference virtual camera, instructions for setting the view volume of the right virtual camera by using lines extending from the position of the right virtual camera to respective ones of the plurality of vertex positions, and instructions for setting the view volume of the left virtual camera by using lines extending from the position of the left virtual camera to respective ones of the plurality of vertex positions.

According to the invention of the fifth and sixth aspects, view volumes including a range the same as the reference virtual plane region included in the view volume of the reference virtual camera are set for the right virtual camera and the left virtual camera, respectively. Namely, the respective view volumes of the right virtual camera and the left virtual camera include the range the same as the reference virtual plane region included in the view volume of the reference virtual camera without excess or deficiency. Therefore, the right virtual camera and the left virtual camera generate images (right image and left image) as large as the image generated by the reference virtual camera. Thus, increase in load required for rendering processing can be suppressed. In addition, the same subject can stereoscopically be displayed on the display while a position of a visual point from the reference virtual camera is maintained.

According to a preferred seventh aspect, the view volume setting instructions are adapted to set the respective view volumes of the right virtual camera and the left virtual camera by using a near clipping plane and a far clipping plane of the view volume of the reference virtual camera.

According to the invention of the seventh aspect, the right virtual camera and the left virtual camera effectively render a depth range the same as a depth range rendered by the reference virtual camera, and therefore increase in load required for rendering processing can be suppressed. In addition, the same subject can stereoscopically be displayed on the display while a range of the visual point of the reference virtual camera is maintained.

According to a preferred eighth aspect, the present display control program further includes first information output instructions for outputting information indicating the respective view volumes of the right virtual camera and the left virtual camera, that are set as a result of execution of the view volume setting instructions.

According to the invention of the eighth aspect, information on the respective view volumes of the right virtual camera and the left virtual camera can be utilized in various programs other than the display control program according to the present invention.

According to a preferred ninth aspect, the display control program further includes second information output instructions for outputting information indicating a distance between the right virtual camera and the left virtual camera, that is set as a result of execution of the virtual camera setting instructions.

According to the invention of the ninth aspect, information on the distance between the right virtual camera and the left virtual camera can be utilized in various programs other than the display control program according to the present invention.

According to a preferred tenth aspect, the second information output instructions are adapted to output a ratio of the distance between the right virtual camera and the left virtual camera, with a width of the reference virtual plane region serving as a reference.

According to the invention of the tenth aspect, the output ratio of distance indicates to which degree a common object located at infinity in the virtual space is displaced between the right image and the left image when the object is virtually photographed with the right virtual camera and the left virtual camera. Therefore, for example, in a case where a far landscape is rendered in one image, the object can be expressed as a picture located in the rearmost part by displaying the right image output by the right virtual camera as displaced by a value in accordance with the output ratio of the distance and similarly displaying the left image output by the left virtual camera as displaced by a value in accordance with the output ratio of the distance.

According to a preferred eleventh aspect, the display control program includes a program encoded as a library.

According to the invention of the eleventh aspect, the display control program according to the present invention can commonly be utilized by a plurality of applications.

According to a further preferred twelfth aspect, the view volume setting instructions are adapted to set the view volume of the right virtual camera extending asymmetrically and the view volume of the left virtual camera extending asymmetrically such that they extend toward one side, in a manner symmetric with respect to each other.

According to the invention of the twelfth aspect, since the right image and the left image corresponding to a human's field of view can be generated, more natural stereoscopic display can be provided.

According to a further preferred thirteenth aspect, the display control program is adapted to accept information for designating a position of a parallax assessment plane in parallel to the reference virtual plane region, for evaluating an amount of parallax produced between the right image generated by the right virtual camera and the left image generated by the left virtual camera.

According to the invention of the thirteenth aspect, the right virtual camera and the left virtual camera can be set after the amount of parallax produced between the right image and the left image is evaluated. Therefore, the right virtual camera and the left virtual camera can appropriately be set in a range allowing the user to comfortably accept stereoscopic display.

According to a further preferred fourteenth aspect, the display control program is adapted to set a parallax assessment plane in parallel to the reference virtual plane region, for evaluating an amount of parallax produced between the right image generated by the right virtual camera and the left image generated by the left virtual camera, at a position farthest from the reference virtual camera in the view volumes of the respective virtual cameras.

According to the invention of the fourteenth aspect, since the parallax assessment plane for evaluating the amount of parallax produced between the right image and the left image is set at a predetermined position, it is not necessary to input information for setting the parallax assessment plane if only the respective view volumes of both of the virtual cameras are set. In addition, since the amount of parallax of the object located farthest from the reference virtual camera among the objects included in the respective view volumes (rendered regions) of both virtual cameras is greatest, the need for taking into account amounts of parallax produced with regard to objects located at other positions is obviated simply by evaluating the amount of parallax at the parallax assessment plane. Therefore, creation of an application can further be simplified.

According to a further preferred fifteenth aspect, the parallax assessment plane is provided on a side opposite to the reference virtual camera, with respect to the reference virtual plane region.

According to the invention of the fifteenth aspect, since the virtual space (typically, a game space or the like) is expressed on the rear side of the display surface of the display when viewed from the user, the virtual space can be viewed without uncomfortable feeling, even though there is dust, dirt or the like on the display surface.

According to a preferred sixteenth aspect, the virtual camera setting instructions include maximum distance determination instructions for determining a tolerable maximum distance between the right virtual camera and the left virtual camera.

According to the invention of the sixteenth aspect, since the right virtual camera and the left virtual camera are set in accordance with a condition at the time when the user actually views the display, such a situation as if the user were actually present in the virtual space can be reproduced.

According to a further preferred seventeenth aspect, the display control program further includes mode setting instructions for setting any of first and second modes. The virtual camera setting instructions include instructions for setting the right virtual camera and the left virtual camera such that an amount of parallax produced between the right image generated by the right virtual camera and the left image generated by the left virtual camera does not exceed a predetermined value when the first mode is set, and instructions for setting the right virtual camera and the left virtual camera such that a distance from the reference virtual plane region to the right virtual camera and the left virtual camera is set to a predetermined value when the second mode is set.

According to the invention of the seventeenth aspect, typically, as a game utilizing an application proceeds, any of a situation that a scene intended by a creator of the application is stereoscopically displayed and a situation that a situation as if the user were actually present in the virtual space is desirably reproduced can be realized.

According to a preferred eighteenth aspect, the present display control program further includes change acceptance instructions for changing at least one of the position of the right virtual camera and the position of the left virtual camera set as a result of execution of the virtual camera setting instructions, in response to an indication to change stereoscopic effect.

According to a further preferred nineteenth aspect, the view volume setting instructions are adapted to change the respective view volumes of the right virtual camera and the left virtual camera when the position of the right virtual camera or the position of the left virtual camera is changed as a result of execution of the change acceptance instructions.

According to the invention of the eighteenth and nineteenth aspects, stereoscopic effect can be adjusted as appropriate, in accordance with how stereoscopic display is viewed by each user or the like.

According to a further preferred twentieth aspect, the change acceptance instructions are adapted to accept the indication to change stereoscopic effect in accordance with a sliding operation along a prescribed one axis direction.

According to a further preferred twenty-first aspect, the change acceptance instructions are adapted to bring the distance between the right virtual camera and the left virtual camera initially set as a result of execution of the virtual camera setting instructions into correspondence with a substantially maximum value of an adjustment range based on the indication of stereoscopic effect.

According to the invention of the twentieth and twenty-first aspects, the user can intuitively control a degree of stereoscopic effect in stereoscopic display expressed on the display, by performing a sliding operation.

An information processing system according to the twenty-second aspect of the present invention includes a display capable of providing stereoscopic display, a virtual camera setting unit for setting respective positions and directions of a right virtual camera and a left virtual camera within a prescribed virtual space used for virtual photographing in the virtual space, and a view volume setting unit for setting respective view volumes of the right virtual camera and the left virtual camera. The right virtual camera and the left virtual camera serve to generate a right image and a left image used for providing stereoscopic display of an image expressing the virtual space on the display, respectively. The virtual camera setting unit is configured such that camera directions of the right virtual camera and the left virtual camera are oriented in an identical direction and the camera direction is perpendicular to a straight line passing through the positions of both of these virtual cameras. The view volume setting unit is adapted to set the view volumes such that both of the view volumes of the right virtual camera and the left virtual camera include a display target region, which is a region in the virtual space at least to be displayed on the display, and the view volume of at least one virtual camera extends asymmetrically with respect to a line extending from the position of one virtual camera in the camera direction, toward a side where the other virtual camera is present.

According to the invention of the twenty-second aspect, a function and effect the same as in the invention according to the first aspect described above can be obtained.

According to a twenty-third aspect, a storage medium storing a program utilized for controlling stereoscopic display is provided. The program includes input instructions for accepting input of a first projection matrix and a first view matrix defining a reference virtual camera in a prescribed virtual space as well as a distance from the reference virtual camera to a virtual plane region. The virtual plane region is a region on a prescribed plane perpendicular to a reference camera direction, which is a camera direction of the reference virtual camera. The program further includes virtual camera setting instructions for setting the reference virtual camera in the virtual space based on the first projection matrix, the first view matrix, and the distance from the reference virtual camera to the virtual plane region accepted as a result of execution of the input instructions and to set respective positions and directions of a right virtual camera and a left virtual camera within the virtual space used for virtual photographing in the virtual space. The virtual camera setting instructions are adapted such that camera directions of the right virtual camera and the left virtual camera are oriented in an identical direction and the camera direction is perpendicular to a straight line passing through the positions of both of these virtual cameras. The program further includes view volume setting instructions for setting respective view volumes of the right virtual camera and the left virtual camera. The view volume setting instructions are adapted to set the view volumes such that both of the view volume of the right virtual camera and the view volume of the left virtual camera include a display target region, which is a region in the virtual space at least to stereoscopically be displayed, and the view volume of at least one virtual camera extends asymmetrically with respect to a line extending from the position of one virtual camera in the camera direction, toward a side where the other virtual camera is present. The program further includes output instructions for outputting a second projection matrix and a second view matrix defining the right virtual camera set as a result of execution of the virtual camera setting instructions and the view volume setting instructions and a third projection matrix and a third view matrix defining the left virtual camera set as a result of execution of the virtual camera setting instructions and the view volume setting instructions.

According to the invention of the twenty-third aspect, typically, a stereoscopic display function can more readily be provided in coordination with an application capable of providing stereoscopic display.

In the description above, for better understanding of the present invention, supplemental explanation and the like showing correspondence with embodiments which will be described later are provided, however, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B show one example of a program configuration mounted on the information processing system according to the present embodiment.

FIG. 7 shows a data item input and output to/from a library for stereoscopic display shown in FIGS. 6A and 6B.

FIG. 11 is a diagram for illustrating a camera matrix according to the present embodiment.

FIG. 20 shows a data item input and output to/from a library for stereoscopic display according to the variation of the present embodiment.

DESCRIPTION OF THE PREFERRED EMBODIMENTS

Figure 1B:
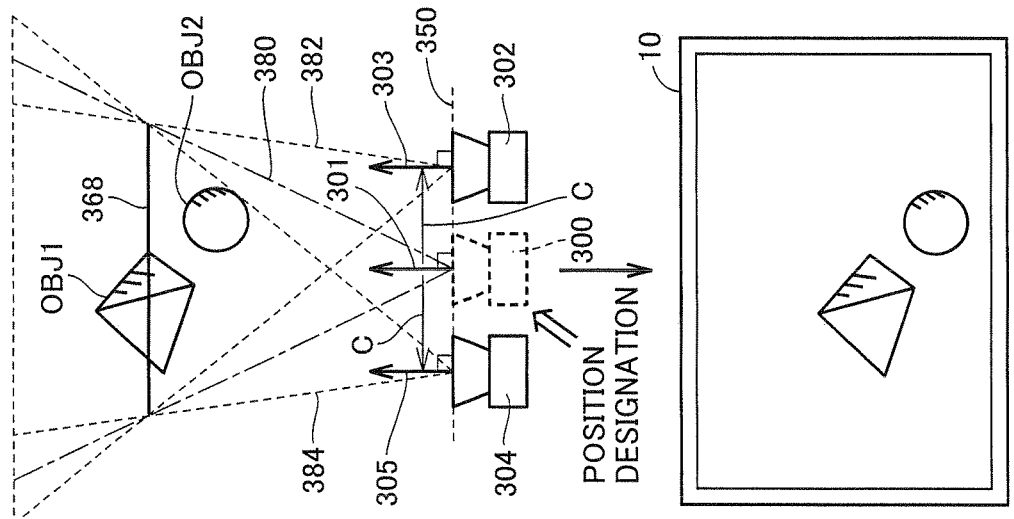
FIGS. 1A and 1B are diagrams for illustrating stereoscopic display processing according to an embodiment of the present invention in comparison with related two-dimensional display processing.

An embodiment of the present invention will be described in detail with reference to the drawings. The same or corresponding elements in the drawings have the same reference characters allotted, and description thereof will not be repeated.

<A. Overview and Concept>

According to one aspect of the present invention, typically, it is an object to provide such an environment that, even when an application or the like including stereoscopic display is created, workload the same as in the case of an application including only two-dimensional display is only required. Initially, overview and a concept according to the present invention will now be described with reference to FIGS. 1A, 1B, 2, and 3.

[a1. Stereoscopic Display]

Figure 1A:
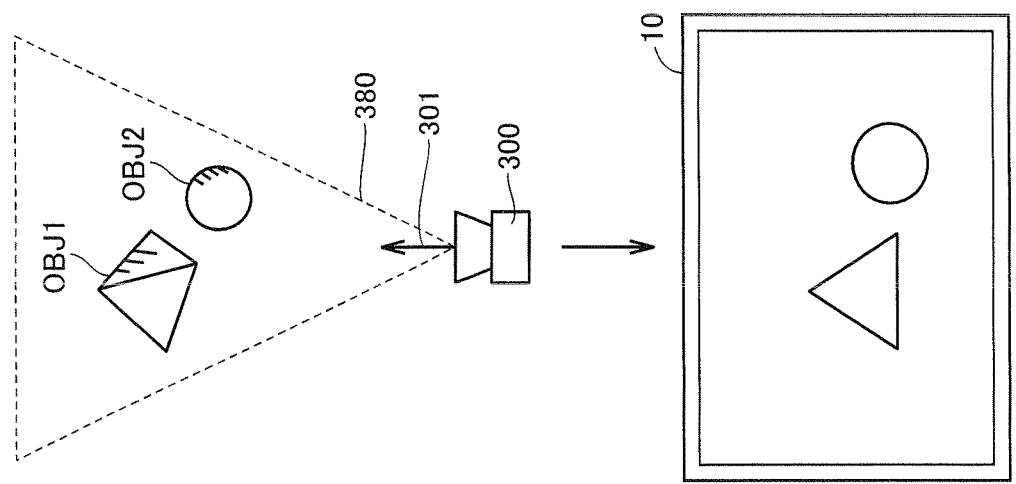

Referring to FIG. 1A, a case where an image expressing a three-dimensional virtual space including objects OBJ1 and OBJ2 is displayed on a display 10 is considered. In this case, a virtual camera 300 is set at any position within the three-dimensional virtual space where objects OBJ1 and OBJ2 are arranged. Then, an image (planar two-dimensional image) is generated by virtually photographing objects OBJ1 and OBJ2 or the like within the three-dimensional virtual space with virtual camera 300. Two-dimensional display is provided on display 10 based on display data including the image generated by this reference virtual camera 300.

Here, virtual camera 300 virtually photographs the three-dimensional virtual space and the object within the three-dimensional virtual space set in the processing for providing only two-dimensional display without providing stereoscopic display.

As will be described later, in stereoscopic display processing according to the present embodiment, by designating a parameter similar to a parameter required for providing two-dimensional display shown in FIG. 1A above, a pair of images (a right image and a left image) necessary for stereoscopic display on display 10 is generated.

Referring to FIG. 1B, by way of example, processing for stereoscopically displaying a range similar to a range rendered in two-dimensional display described above will be described hereinafter.

In this case, initially, in a three-dimensional virtual space including objects OBJ1 and OBJ2, virtual camera 300 is designated as in two-dimensional display shown in FIGS. 1A and 1B above (it is noted that the "virtual camera set as in two-dimensional display" is referred to as a reference virtual camera). With an arrangement position of this reference virtual camera 300 serving as the reference, respective positions and directions of a right virtual camera 302 for generating a right image and a left virtual camera 304 for generating a left image are set. More specifically, with a camera position of reference virtual camera 300 serving as the reference, right virtual camera 302 is set such that it is distant by a distance C in a right direction from reference virtual camera 300 and left virtual camera 304 is set such that it is distant by distance C in a left direction from reference virtual camera 300. It is noted that respective camera directions and angles of view of the right virtual camera and the left virtual camera are set to values the same as those of the camera direction and the angle of view of reference virtual camera 300. Namely, here, as will be described later, respective fields of view (view volumes) of right virtual camera 302 and left virtual camera 304 are also set. By thus virtually photographing objects OBJ1 and OBJ2 or the like within the three-dimensional virtual space with arranged right virtual camera 302 and left virtual camera 304, the right image and the left image are generated, respectively.

Then, display data for right eye is generated based on the right image and display data for left eye is generated based on the left image. Stereoscopic display on display 10 is provided based on such display data.

In summary, in the stereoscopic display processing according to the present embodiment, in order to generate a right image and a left image used for stereoscopically displaying an image expressing the virtual space on display 10, with reference virtual camera 300 serving as the reference, right virtual camera 302 and left virtual camera 304 used for virtual photographing of the virtual space (and the object included therein) are set within the virtual space. Here, right virtual camera 302 and left virtual camera 304 are set within the virtual space such that a camera direction 303 of right virtual camera 302 and a camera direction 305 of left virtual camera 304 are the same (that is, camera direction 303 and camera direction 305 are in parallel to each other) and camera direction 303 (and camera direction 305) is perpendicular to a straight line (a reference line 350) passing through respective positions of right virtual camera 302 and left virtual camera 304.

When right virtual camera 302 and left virtual camera 304 are thus set, field of views (view volumes) of right virtual camera 302 and left virtual camera 304 are set respectively. Here, a display target region, which is a range to desirably be displayed around the display surface of display 10 (typically, a reference virtual plane region 360 which is a two-dimensional plane set within the virtual space or a range where a specific object is present), is designated. Namely, the display target region corresponds at least to a region in the virtual space to be displayed on the display. This display target region is perpendicular to camera directions 303 and 305 and set on the side of camera directions 303 and 305. For right virtual camera 302 and left virtual camera 304, a view volume 382 of right virtual camera 302 and a view volume 384 of left virtual camera 304 are set respectively such that both of them include the display target region.

Namely, the plane of the display target region is perpendicular to camera directions 303 and 305. In addition, when viewed from right virtual camera 302 or left virtual camera 304, the display target region is present on the side of camera directions 303 and 305. Further, a direction extending from a point intermediate between right virtual camera 302 and left virtual camera 304 to the center of the display target region matches with camera directions 303 and 305.

Furthermore, with regard to at least one virtual camera, the view volume of one virtual camera is set so as to extend toward the side where the other virtual camera is present, asymmetrically with respect to a line extending from the position of the other virtual camera in a corresponding camera direction (camera direction 303 or 305).

Here, the phrase that the view volume of one virtual camera "extends toward" the side where the other virtual camera is present, asymmetrically with respect to the camera direction of the virtual camera, means that, assuming a straight line extending from the position of one virtual camera in the camera direction of one virtual camera as a camera axis of one virtual camera, a center (center of gravity) of any plane perpendicular to the camera axis of one virtual camera included in the view volume of one virtual camera is present closer to the side where the other virtual camera is present, relative to the camera axis. In other words, the phrase refers to a state that the center of gravity of the entire view volume of one virtual camera is present closer to the side where the other virtual camera is present, with respect to the camera axis of one virtual camera.

More preferably, the view volume of right virtual camera 302 extending asymmetrically and the view volume of left virtual camera 304 extending asymmetrically extend in a manner symmetric with respect to each other. Thus, a right image and a left image corresponding to a human's field of view can be generated, and therefore more natural stereoscopic display can be provided.

According to the stereoscopic display processing as described above, for a creator or the like of an application, by designating a setting value for reference virtual camera 300 as in an application utilizing only two-dimensional display (without utilizing stereoscopic display) as shown in FIG. 1A, setting values for respective right virtual camera 302 and left virtual camera 304 necessary for providing stereoscopic display can be obtained.

In addition, according to the stereoscopic display processing as described above, since respective view volumes of right virtual camera 302 and left virtual camera 304 extending asymmetrically toward the side where the other virtual camera is present are set, an (extra) image covering a range not used for stereoscopic display on display 10 is not generated. Therefore, unnecessary rendering processing can be suppressed and an amount of processing involved with the stereoscopic display processing can be reduced.

[a2. Definition]

(i) "Stereoscopic display" herein means that an image is expressed in such a manner as enabling a user to stereoscopically visually recognize at least some objects included in the image. Typically, by having a user visually recognize a pair of planar, two-dimensional images (stereo images) having parallax and utilizing physiological functions of human eyes and brain, the user is caused to feel stereoscopic effect.

"Parallax" herein refers to a difference in how a point of interest is viewed, between a subject image visually recognized by the user's right eye and a subject image visually recognized by the user's left eye. Typically, when a certain object is observed from different points of observation and images are generated respectively based on respective observations at the points of observation, the resultant images have parallax. Further, depending on the difference between the point of observation for generating an image for the right eye and the point of observation for generating an image for the left eye, a subject image of a certain object in the displayed image for the right eye and a subject image thereof in the displayed image for the left eye are different in position where they appear. Magnitude of such a difference in position between the subject mages of the same object in two images is referred to as an "amount of parallax."

(ii) "Right" and "left" herein are used for distinction between the eyes with which the user visually recognizes an object. Namely, the "right image" described above indicates that it is an image to visually be recognized by the user's right eye, and the "left image" described above indicates that it is an image to visually be recognized by the user's left eye. In addition, a virtual camera for generating a "right image" is also referred to as a "right virtual camera," while a virtual camera for generating a "left image" is also referred to as a "left virtual camera."

Figure 2:
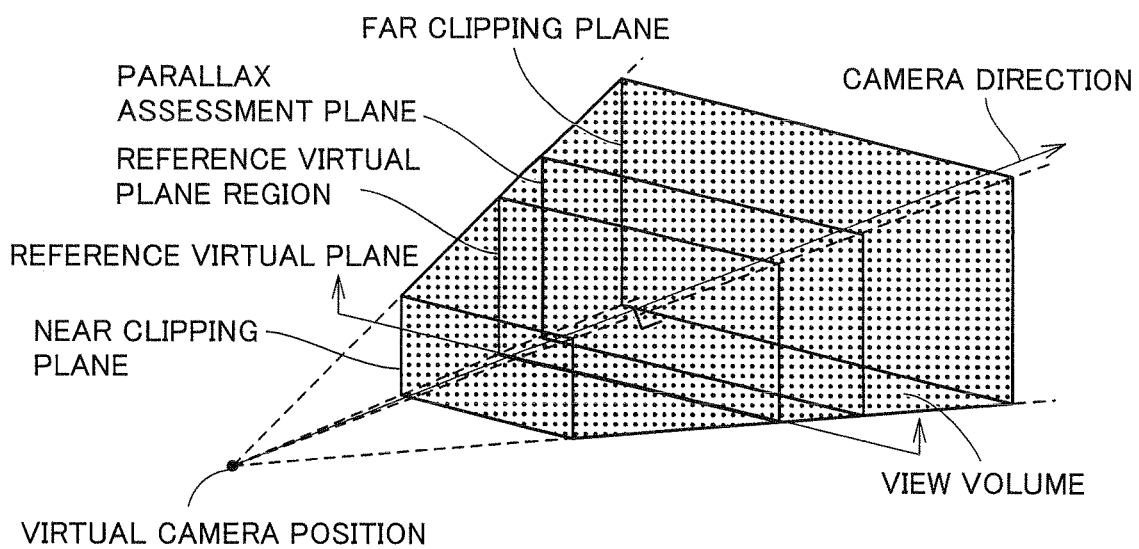
FIG. 2 shows one example of a field of view of a virtual camera according to the present embodiment.

(iii) A "view volume" herein refers to the following range. Referring to FIG. 2, the virtual camera according to the present embodiment renders only an object within a prescribed range in a camera direction (a hatched range in FIG. 2) in a three-dimensional virtual space. In other words, a range outside a viewing angle of the virtual camera (a range enclosed with a dashed line in FIG. 2) is not rendered. In addition, a "near clipping plane" is set on a side in the vicinity of the virtual camera, while a "far clipping plane" is set on a side farther therefrom. These near clipping plane and far clipping plane are set perpendicular to a line of the camera direction of the virtual camera. An object present between these near clipping plane and far clipping plane and included within the viewing angle of the virtual camera is to be rendered.

A range actually viewed by the user when an image is generated as a result of virtual photographing by the virtual camera in this manner (that is, a rendered range) is also referred to as a "view volume". More specifically, a frustum of pyramid having the near clipping plane as one surface and the far clipping plane as the other surface in a whole quadrangular pyramid having a virtual camera position as a vertex and the far clipping plane of the virtual camera as a bottom surface is referred to as the "view volume". This "view volume" may also be referred to as a "view frustum" or a "viewing frustum". Therefore, in photographing a three-dimensional virtual space with a virtual camera having a certain view volume (field of view), the space contained in the view volume is rendered by the virtual camera.

Turning to the example described above, a view volume 380 is set in correspondence with reference virtual camera 300 shown in FIG. 1A, view volume 382 is set in correspondence with right virtual camera 302 shown in FIG. 1B, and view volume 384 is set in correspondence with left virtual camera 304 shown FIG. 1B.

(iv) In providing stereoscopic display on display 10, a "reference virtual plane," which is a plane corresponding to a position of the display surface of display 10 (a plane of which presence the user viewing stereoscopic display feels at a position of the display surface of display 10 in the three-dimensional virtual space), is set within the three-dimensional virtual space (see FIG. 2). It is noted that the reference virtual plane may be a "plane of which presence the user viewing stereoscopic display feels at a position having prescribed offset from the display surface of display 10 in the three-dimensional virtual space." This "reference virtual plane" is also set perpendicular to the camera direction. In addition, since an actual size of the display surface of display 10 is finite, a "reference virtual plane region" corresponding to a range rendered on the display surface of display 10 in the reference virtual plane can be defined. Namely, a rendered range in the reference virtual plane which is an infinite plane (a range included in the view volume) is the "reference virtual plane region."

The "reference virtual plane region" defines a position and a region within the three-dimensional virtual space of which presence the user feels around the display surface of display 10 in providing stereoscopic display on display 10 (as described previously, typically, exactly a position of the display surface, however, the position may be set, for example, as a position having prescribed offset from the display surface). Namely, though stereoscopic display includes a portion that looks like popping up toward the front from the display surface of display 10 or a portion that looks like recessed in the rear of the display surface, for a user, a space corresponding to a portion around the reference virtual plane region just looks like locating around the display surface of display 10. When right virtual camera 302 and left virtual camera 304 are set at respective positions as shown in FIG. 1B, how an object located in the space corresponding to the portion around the reference virtual plane region is displayed is the same between a right image and a left image generated by the respective virtual cameras (that is, there is substantially no parallax).

Therefore, for a user who views the display surface of display 10, (an object located in) the portion corresponding to the reference virtual plane region looks like present at substantially the same position between the image visually recognized by the right eye (the right image) and the image visually recognized by the left eye (the left image), and consequently the portion looks like present on the display surface of display 10, which is a surface actually displaying these images.

On the other hand, regarding (an object located in) a portion corresponding to a plane set at a position different from the reference virtual plane region, the right object image and the left object image are different in display position depending on positional relation between right virtual camera 302 and left virtual camera 304 (that is, display having some parallax is provided), and for a user, the portion looks like present at a position popping up from the display surface of display 10 or at a position recessed therefrom.

(v) As described above, in the present embodiment, a pair of planar, two-dimensional images having parallax is displayed on display 10, so as to have the user feel stereoscopic effect. As an amount of parallax of a certain object within this pair of planar, two-dimensional images is greater, the object is visually recognized by the user with greater stereoscopic effect. If the amount of parallax increases beyond a certain value, to the contrary, the user is less likely to feel stereoscopic effect. Therefore, in providing stereoscopic display on display 10, the amount of parallax should be maintained in an appropriate range. Hereinafter, a maximum amount of parallax between the right image and the left image on the display surface that allows the user to comfortably accept stereoscopic display on display 10 is referred to as a "parallax limit amount." A threshold value up to which stereoscopic effect can comfortably be felt, that is, a parallax limit amount, is determined by an actual screen width of the display surface of display 10, an actual interval between the user's eyes, an actual distance from the user to the display surface of display 10, or the like.

Therefore, in the present embodiment, an object is displayed on the display surface of display 10 such that an amount of parallax of the object desired to visually be recognized by the user is set to a value not higher than this parallax limit amount.

In order to control stereoscopic effect of an object displayed on such display 10, in the present embodiment, a plane for evaluating a generated amount of parallax is set within the three-dimensional virtual space. Such a plane for evaluating an amount of parallax is hereinafter referred to as a "parallax assessment plane" (see FIG. 2). This parallax assessment plane is also set perpendicular to the camera direction of the virtual camera. Namely, a parallax assessment plane is set at a position on the rear side relative to the reference virtual plane (opposite to the virtual camera), in parallel to the reference virtual plane.

More specifically, between a right image and a left image obtained by virtual photographing of a display target located on the parallax assessment plane set within the three-dimensional virtual space with the right virtual camera and the left virtual camera respectively, parallax in accordance with positional relation between the right virtual camera and the left virtual camera is generated. Then, the right virtual camera and the left virtual camera are set such that an amount of position displacement of the object located on the parallax assessment plane does not exceed a prescribed threshold value. Thus, an amount of parallax of each object present in front of the parallax assessment plane (on the virtual camera side) can be equal to or smaller than the parallax limit amount. It is noted that a separate parallax assessment plane (a second parallax assessment plane) may be provided at a position on the front side of the reference virtual plane and the virtual camera may be set such that an amount of position displacement of a display target located on the parallax assessment plane does not exceed a prescribed threshold value. In the present embodiment described hereinafter, an example where a second parallax assessment plane is not provided such that the reference virtual plane can be set at a desired position is shown.

[a3. Function and Processing]

Figure 3:
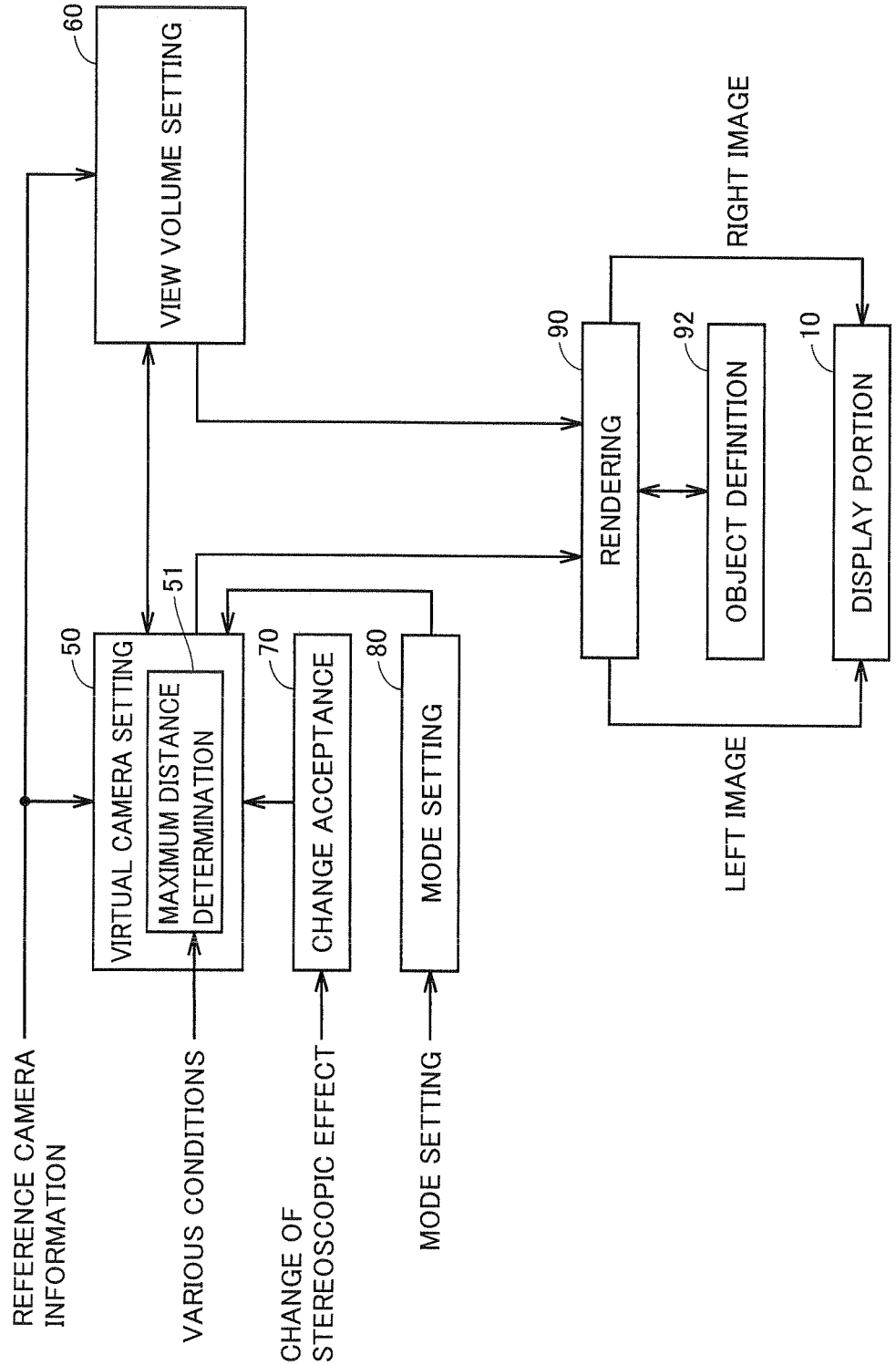
FIG. 3 schematically shows a function involved with the stereoscopic display processing according to the present embodiment.

Referring to FIG. 3, stereoscopic display processing according to the present embodiment includes a virtual camera setting function 50, a view volume setting function 60, a change acceptance function 70, a mode setting function 80, and a rendering function 90.

Virtual camera setting function 50 determines respective arrangement positions within the three-dimensional virtual space, of right virtual camera 302 and left virtual camera 304 for generating a right image and a left image used for stereoscopically displaying an object within the three-dimensional virtual space on display 10.

View volume setting function 60 sets respective view volumes 382 and 384 of right virtual camera 302 and left virtual camera 304 of which arrangement positions were determined by virtual camera setting function 50. In the embodiment which will be described later, an example where respective arrangement positions and view volumes of right virtual camera 302 and left virtual camera 304 are determined in parallel is shown, however, arrangement positions and view volumes may be determined in series.

More specifically, virtual camera setting function 50 includes a maximum distance determination function 51. Maximum distance determination function 51 determines a tolerable maximum distance between right virtual camera 302 and left virtual camera 304. As the distance between right virtual camera 302 and left virtual camera 304 in the three-dimensional virtual space is greater (in other words, the two virtual cameras are more distant from each other), a greater amount of parallax may be produced between the right image and the left image. On the other hand, when the amount of parallax between the right image and the left image becomes greater to exceed a certain value as described above, the user is less likely to feel stereoscopic effect. Therefore, maximum distance determination function 51 determines how distant right virtual camera 302 and left virtual camera 304 can be arranged under various conditions provided by an application, a user and the like.

As described above, virtual camera setting function 50 and view volume setting function 60 calculate respective setting values for right virtual camera 302 and left virtual camera 304 based on reference camera information set with any method.

Change acceptance function 70 changes at least one of the arrangement position of right virtual camera 302 and the arrangement position of left virtual camera 304 determined by virtual camera setting function 50, in response to an indication to change stereoscopic effect. This is because the respective arrangement positions of right virtual camera 302 and left virtual camera 304 are basically determined such that a tolerable maximum value is set under a given condition by virtual camera setting function 50, however, there is need for further adjustment of setting values rather than using setting values as they are without exception. It is noted that an indication to change stereoscopic effect is an indication indicating change in a degree of stereoscopic effect provided on display 10. The indication to change stereoscopic effect includes not only such a manner that the user actually views the stereoscopically displayed object and then provides input but also such a manner that a creator of an application restricts stereoscopic effect within a range intended in advance.

In addition, when change acceptance function 70 changes the arrangement position of at least one of right virtual camera 302 and left virtual camera 304, view volume setting function 60 changes previously set view volume(s) 382 and/or 384 of right virtual camera 302 and left virtual camera 304. Namely, view volume setting function 60 sets a more appropriate view volume in accordance with change in the arrangement position(s) of right virtual camera 302 and/or left virtual camera 304.

It is noted that exemplary input means for accepting the user's indication to change stereoscopic effect input to change acceptance function 70 will be described in detail later with reference to FIGS. 16 to 18.

The stereoscopic display processing according to the present embodiment allows selection between two modes (an "application-priority mode" and a "real mode"), as a mode involved with stereoscopic display on display 10. Mode setting function 80 sets any of the "application-priority mode" and the "real mode" in response to mode setting provided by an application (that is, intention of the creator of the application), the user, and the like.

In the "application-priority mode," respective setting values for right virtual camera 302 and left virtual camera 304 are determined such that contents in a range intended by the creator of the application are stereoscopically displayed. More specifically, when the "application-priority mode" is set, virtual camera setting function 50 sets right virtual camera 302 and left virtual camera 304 such that an amount of parallax generated between the right image generated by right virtual camera 302 and the left image generated by left virtual camera 304 does not exceed a value predetermined (by an application or the like).

On the other hand, in the "real mode", respective setting values for right virtual camera 302 and left virtual camera 304 are determined such that the user can be given feeling as if he/she were present in the three-dimensional virtual space. More specifically, when the "real mode" is set, virtual camera setting function 50 sets right virtual camera 302 and left virtual camera 304 such that a distance from the reference virtual plane region to right virtual camera 302 and left virtual camera 304 is set to a predetermined value. It is noted that a specific example of processing for determining respective setting values for right virtual camera 302 and left virtual camera 304 in each mode will be described in detail with reference to FIGS. 11, 12A to 12C, 13A to 13D, 14A to 14C, and 15A to 15C.

Rendering function 90 generates the right image and the left image with reference to object definition 92, based on the respective setting values for right virtual camera 302 and left virtual camera 304 determined by virtual camera setting function 50 and view volume setting function 60. This object definition 92 includes information on the three-dimensional virtual space, the object within the three-dimensional virtual space, and the like. Namely, rendering function 90 generates the right image and the left image used for stereoscopically displaying the object within the three-dimensional virtual space on display 10 by virtually photographing the object with right virtual camera 302 and left virtual camera 304.

Though the arrangement position within the three-dimensional virtual space, the view volume, and the like of each virtual camera described above can be designated with any method, from a point of view of maintaining consistency with a rendering technique and the like for a related three-dimensional virtual space, they are preferably defined as a camera matrix (a projection matrix and a view matrix). Details of this camera matrix will be described later.

<B. Typical Mounting>

[b1. Display]

A display device of any type capable of providing stereoscopic display to the user can be adopted as display 10. Namely, any device allowing a user to visually recognize two images having parallax with respective eyes may be adopted as display 10. Typically, for example, a front parallax barrier type liquid crystal display device, a lenticular type display device or the like can be adopted. Alternatively, a configuration in which two images different in contained main wavelength component are independently displayed and stereoscopic display is provided by having the user wear glasses incorporating two respective color filters different in transmitted wavelength range may be adopted. Similarly, a configuration may be such that two images are displayed with directions of polarization being differed and stereoscopic display is provided by having the user wear glasses incorporating two respective polarizing filters corresponding to the two directions of polarization.

A configuration of display 10 in a case where a front parallax barrier type configuration having a parallax barrier is adopted as a parallax optical system will be described hereinafter with reference to FIG. 4. In this display 10, by displaying a pair of a right image and a left image having certain parallax on the display surface thereof, the user can visually recognize stereoscopic effect in accordance with an amount of parallax between the left and right display images.

Figure 4:
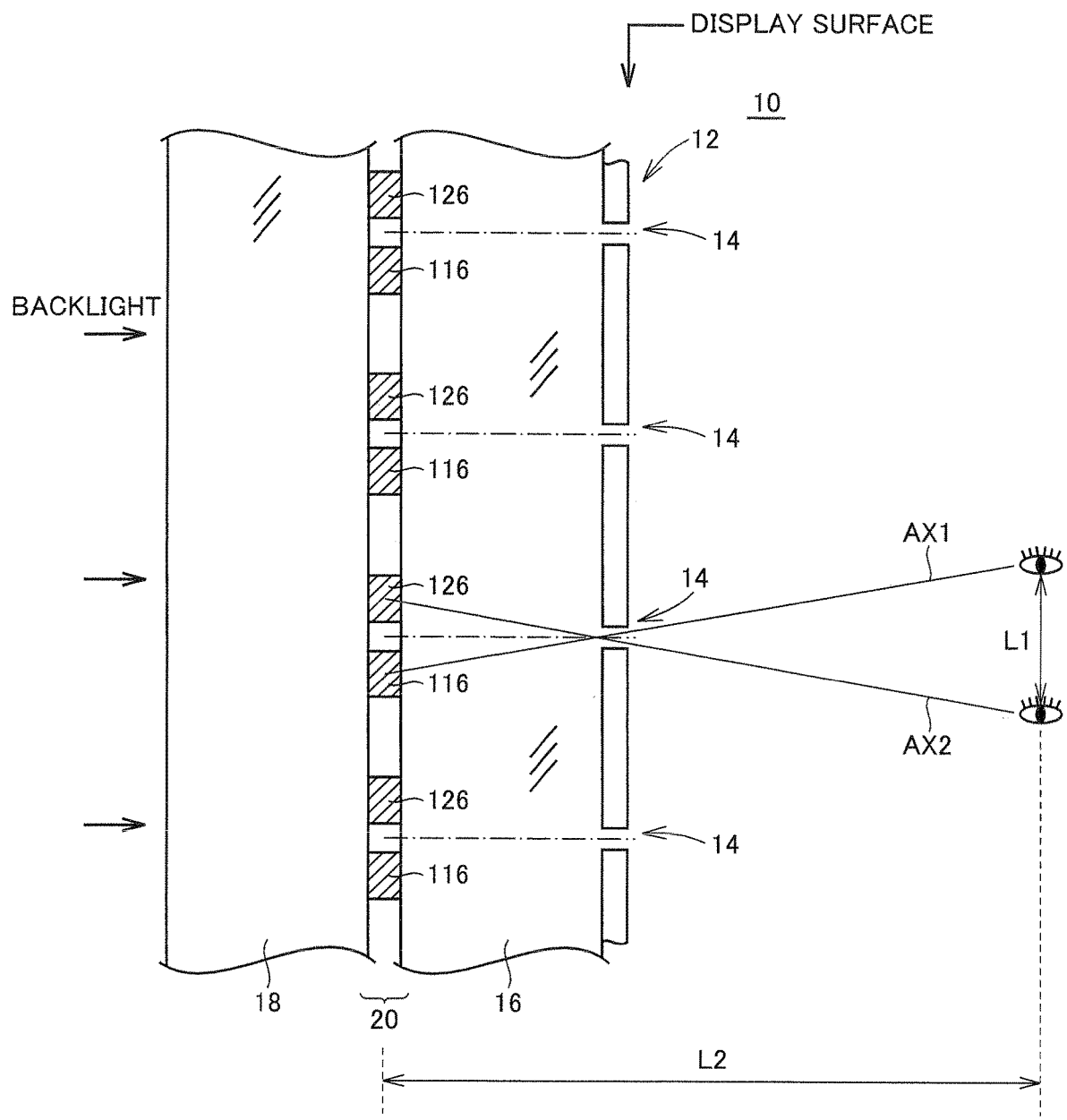
FIG. 4 shows one example of a structure of a display according to the present embodiment.

FIG. 4 shows a cross-sectional structure of a front parallax barrier type liquid crystal display device. Display 10 shown in FIG. 4 is configured such that, when the user faces display 10, light beams from different pixels enter fields of view of the user's right and left eyes respectively, owing to the parallax barrier.

More specifically, display 10 includes a first LCD 116 and a second LCD 126 provided between a glass substrate 16 and a glass substrate 18. Each of first LCD 116 and second LCD 126 includes a plurality of pixels and is a spatial light modulator for adjusting light from a backlight for each pixel. Typically, pixels in first LCD 116 and pixels in second LCD 126 are alternately arranged. A not-shown backlight is provided on a side of glass substrate 18 opposite to glass substrate 16 and light from this backlight is emitted toward first LCD 116 and second LCD 126.

A parallax barrier 12 which is a parallax optical system, is provided on a side opposite to the side where glass substrate 16 is in contact with first LCD 116 and second LCD 126. In this parallax barrier 12, a plurality of slits 14 are provided in rows and columns at prescribed intervals. Corresponding pixels of first LCD 116 and corresponding pixels of second LCD 126 are arranged symmetrically to each other, with an axis passing through a central position of each slit 14 and perpendicular to a surface of glass substrate 16 serving as the reference. By appropriately controlling positional relation with pixels corresponding to such slit 14 as well as first LCD 116 and second LCD 126 in accordance with an image to be displayed, prescribed parallax between the user's eyes can be provided.

Namely, each slit 14 in parallax barrier 12 restricts a field of view of each of the user's right and left eyes to a corresponding angle. Typically, the user's right eye can visually recognize only the pixels of first LCD 116 on an optical axis Ax1, while the user's left eye can visually recognize only the pixels of second LCD 126 on an optical axis Ax2. Here, by causing the pixels of first LCD 116 and the pixels of second LCD 126 to display the corresponding pixels of two respective images having prescribed parallax, prescribed parallax can be given to the user.

In the example shown in FIG. 4, the surface of parallax barrier 12 on the user side corresponds to the "display surface" of display 10.

[b2. System Configuration]

The stereoscopic display processing according to the present embodiment above can be mounted as a system using a computer. A configuration example of mounting as an information processing system will be described hereinafter with reference to FIG. 5.

Figure 5:
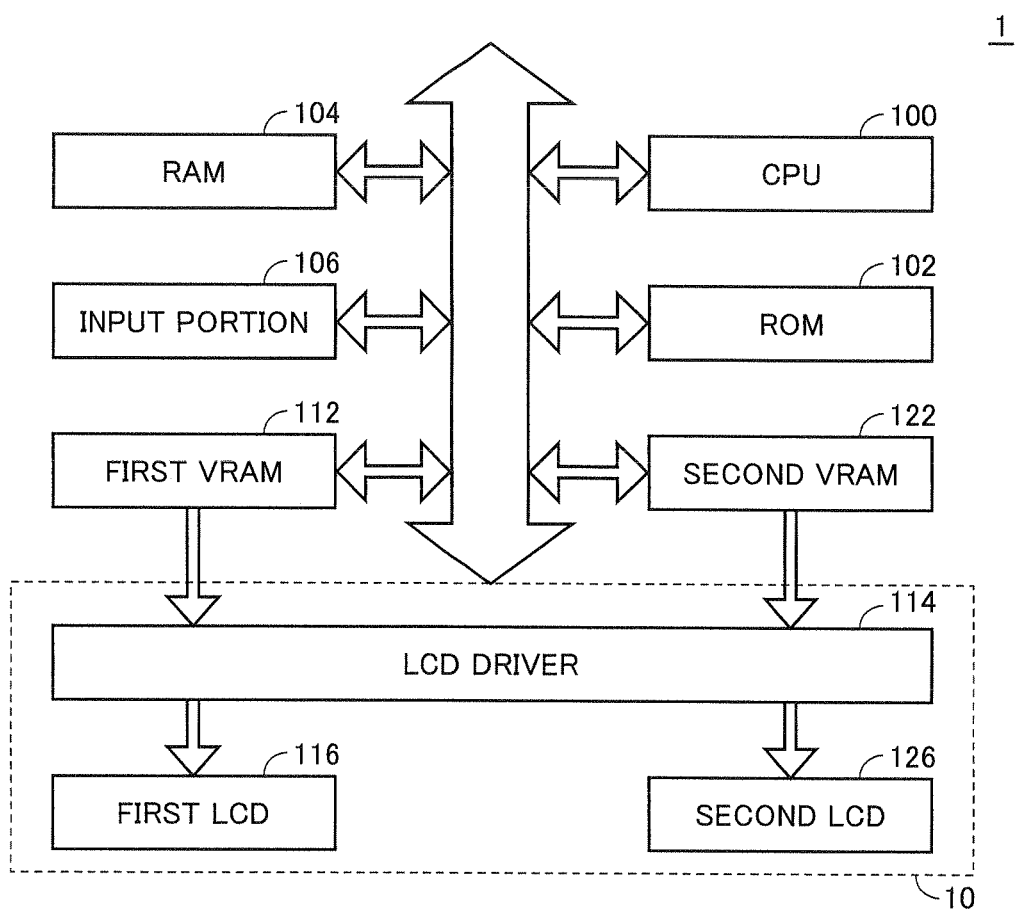
FIG. 5 shows an internal configuration of an information processing system according to the present embodiment.

Referring to FIG. 5, an information processing system 1 according to the present embodiment is typically a computer capable of performing processing using a processor. It is noted that information processing system 1 may be implemented by a personal computer, a work station, a portable terminal, a PDA (Personal Digital Assistant), a portable telephone, a portable game device, or the like.

Information processing system 1 includes display 10, a CPU (Central Processing Unit) 100, a ROM (Read Only Memory) 102, a RAM (Random Access Memory) 104, an input portion 106, and first and second VRAMs (Video RAMs) 112 and 122. It is noted that these portions are connected to each other through an internal bus so that data can be communicated therebetween.

CPU 100 executes a program stored in ROM 102 or the like by developing the program in RAM 104. By executing the program, CPU 100 provides display control processing or accompanying various types of processing as will be described later. It is noted that a program executed by CPU 100 may be distributed on a storage medium such as a DVD-ROM (Digital Versatile Disc ROM), a CD-ROM (Compact Disk ROM), a flexible disc, a flash memory, various memory cassettes, and the like. Therefore, information processing system 1 may read a stored program code or the like from such a storage medium. In such a case, information processing system 1 is adapted to make use of a reading device adapted to a storage medium. Alternatively, in an example where a program as described above is distributed through a network, the distributed program may be installed in information processing system 1 through a not-shown communication interface or the like.

As will be described later, the program according to the present embodiment may be classified into an application and a library commonly utilized by a plurality of applications (or a sub routine or a module). Namely, this library corresponds to a program utilized for controlling stereoscopic display in various applications. In this case, for example, such a configuration that firmware including a library is stored in advance in ROM 102 or the like and an application stored in a non-transitory storage medium that can be attached to information processing system 1 is read and executed by CPU 100 is also possible.

ROM 102 is a device for storing a program to be executed by CPU 100 as described above, various setting parameters and the like in a non-volatile manner. Typically, ROM 102 is implemented by a mask ROM, a semiconductor flash memory or the like.

RAM 104 functions as a work memory for developing a program to be executed by CPU 100 as described above or temporarily storing data necessary for execution of the program. In some cases, RAM 104 may also store data of images to be used for providing stereoscopic display on information processing system 1.

Input portion 106 is a device for accepting a user's operation, and it is typically implemented by a keyboard, a mouse, a touch pen, a trackball, a pen tablet, various types of buttons (switches), or the like. When input portion 106 accepts any user's operation thereon, it transmits a signal indicating corresponding operation contents to CPU 100.

First VRAM 112 and second VRAM 122 are storage devices for storing data corresponding to a right image to be displayed on first LCD 116 and to a left image to be displayed on second LCD 126, respectively. Namely, display data obtained through display control processing or the like as will be described later, which is performed by CPU 100, is successively written in first VRAM 112 and second VRAM 122. Then, rendering processing in display 10 is controlled based on the display data written in first VTRAM 112 and second VRAM 122.

Display 10 includes an LCD driver 114 in addition to first LCD 116 and second LCD 126 described above, LCD driver 114 is associated with first VRAM 112 and second VRAM 122. LCD driver 114 controls turn-on/turn-off (ON/OFF) of pixels constituting first LCD 116 based on the display data written in first VRAM 112, and controls turn-on/turn-off (ON/OFF) of pixels constituting second LCD 126 based on the display data written in second VRAM 122.

[b3. Program Configuration]

The display control program mounted on information processing system 1 according to the present embodiment may include a portion mounted as an application and a portion mounted as a library. A mounting example of a program in information processing system 1 according to the present embodiment will be described hereinafter with reference to FIGS. 6A and 6B.

FIG. 6A is a diagram showing one example of a program configuration mounted on information processing system 1 according to the present embodiment. In information processing system 1 shown in FIG. 6A, an application 200A and firmware 250A are mounted. Typically, application 200A is distributed as stored in a storage medium, and firmware 250A is stored in advance in ROM 102 (FIG. 5) or the like. CPU 100 of information processing system 1 reads and executes instructions included in application 200A and firmware 250A as necessary.

Application 200A includes an input module 202, a proceeding module 204, an image rendering module 206, object definition data 208, and a library for stereoscopic display 218.

Input module 202 generates an internal command in accordance with an indication provided through input portion 106 (FIG. 5) or the like by the user. More specifically, input module 202 generates a necessary internal command in response to input of an indication to change stereoscopic effect or mode setting. Namely, input module 202 provides change acceptance function 70 and mode setting function 80 shown in FIG. 3.

Proceeding module 204 proceeds with the application in accordance with the internal command generated by input module 202. Namely, proceeding module 204 successively updates display data or various parameters as the application proceeds.

Image rendering module 206 provides rendering function 90 shown in FIG. 3. More specifically, when proceeding module 204 designates only information on reference virtual camera 300 shown FIG. 1B, image rendering module 206 calls library for stereoscopic display 218 so as to obtain information on right virtual camera 302 and left virtual camera 304, and generates a right image and a left image based on the obtained information (details will be described later).

Object definition data 208 includes definition of a three-dimensional virtual space for generating a right image and a left image and an object included in the three-dimensional virtual space.

Library for stereoscopic display 218 calculates respective setting values for right virtual camera 302 and left virtual camera 304 for providing stereoscopic display, in response to designation of information or the like on reference virtual camera 300 shown in FIG. 1B. In addition, library for stereoscopic display 218 outputs the calculated value indicating positional relation between right virtual camera 302 and left virtual camera 304 as a return value. Namely, library for stereoscopic display 218 provides virtual camera setting function 50 and view volume setting function 60 shown in FIG. 3. Details of an interface of library for stereoscopic display 218 will be described later with reference to FIG. 7.

Firmware 250A provides a function for controlling each piece of hardware constituting information processing system 1 shown in FIG. 5 or a function for displaying a menu screen or the like. It is noted that a part or the entirety of an OS (Operating System) may be included as firmware 250A.

Though an example where application 200A includes library for stereoscopic display 218 in the program configuration shown in FIG. 6A is shown, this library for stereoscopic display 218 may be mounted in a form shared by a plurality of applications including stereoscopic display, as shown in FIG. 6B.

FIG. 6B is a diagram showing another example (a variation) of a program configuration mounted on information processing system 1 according to the present embodiment. In the program configuration shown in FIG. 6B, library for stereoscopic display 218 is incorporated as a part of firmware 250B. On the other hand, an application 200B does not include library for stereoscopic display 218, and it calls library for stereoscopic display 218 of firmware 250B as necessary.

[b4. Library for Stereoscopic Display]

Library for stereoscopic display 218 according to the present embodiment performs processing as will be described later when the setting value for the reference virtual camera is input as described above, and outputs respective setting values for right virtual camera 302 and left virtual camera 304 as results thereof. Namely, library for stereoscopic display 218 outputs information indicating the respective, set view volumes of right virtual camera 302 and left virtual camera 304 and outputs information indicating the set distance between right virtual camera 302 and left virtual camera 304. A specific example of an input and output interface of library for stereoscopic display 218 will be described hereinafter with reference to FIG. 7.

FIG. 7 is a diagram for illustrating a data item input and output to/from library for stereoscopic display 218 shown in FIGS. 6A and 6B.

As described above, library for stereoscopic display 218 allows selection between two modes (the "application-priority mode" and the "real mode") as a mode involved with stereoscopic display on display 10. Therefore, mode information indicating one of the two modes above is designated when library for stereoscopic display 218 is made use of (called). Then, a data item and a parameter as shown below are exchanged between library for stereoscopic display 218 and an application or the like.

Referring to FIG. 7, when the "application-priority mode" is designated, library for stereoscopic display 218 accepts input of (1) reference virtual camera information, (2) reference virtual plane information, (3) parallax assessment plane information, and (4) mode information, and outputs (5) right virtual camera information, (6) left virtual camera information, and (7) a distance between the virtual cameras.

(1) Reference virtual camera information is information defining an arrangement position, a view volume and the like of reference virtual camera 300 shown in FIG. 1B (respective setting values for a viewing angle, a near clipping plane, a far clipping plane, and the like), and typically, a camera matrix is used. Though details will be described later, this camera matrix includes a projection matrix and a view matrix.

(2) Reference virtual plane information is information for defining a position of the reference virtual plane (a plane including the reference virtual plane region) (see FIG. 2) with respect to reference virtual camera 300 shown in FIG. 1B, and typically it includes a virtual space distance from an arrangement position of reference virtual camera 300 to the reference virtual plane (reference virtual plane region) (see FIG. 2).

(3) Parallax assessment plane information is information for defining the parallax assessment plane, and a position of the parallax assessment plane (see FIG. 2) for evaluating an amount of parallax produced between the right image generated by right virtual camera 302 and the left image generated by left virtual camera 304 is defined. Typically, (3) parallax assessment plane information includes a virtual space distance from an arrangement position of reference virtual camera 300 shown in FIG. 1B to the parallax assessment plane or a distance between the reference virtual plane and the parallax assessment plane.

(4) Mode information includes any of the "application-priority mode" and the "real mode" described above.

(5) Right virtual camera information is information defining an arrangement position, a view volume and the like (respective setting values for a viewing angle, a near clipping plane, a far clipping plane, and the like) of right virtual camera 302 calculated in accordance with the setting of reference virtual camera 300 shown in FIG. 1B. Similarly, (6) left virtual camera information is information defining an arrangement position, a view volume and the like (respective setting values for a viewing angle, a near clipping plane, a far clipping plane, and the like) of left virtual camera 304 calculated in accordance with the setting of reference virtual camera 300 shown in FIG. 1B. Typically, for any of the right virtual camera information and the left virtual camera information, a camera matrix including a projection matrix and a view matrix is used.

(7) Distance between the virtual cameras is information indicating positional relation between right virtual camera 302 and left virtual camera 304 calculated in accordance with the setting of reference virtual camera 300, and it includes information on a distance between right virtual camera 302 and left virtual camera 304 in the three-dimensional virtual space. Preferably, a value obtained by standardizing a distance between right virtual camera 302 and left virtual camera 304, specifically, a ratio of a "distance between right virtual camera 302 and left virtual camera 304" to a "width in a lateral direction of the reference virtual plane region (see FIG. 2)," is used as the distance between the virtual cameras.

Meanwhile, when the "real mode" is designated, library for stereoscopic display 218 accepts input of (1) reference virtual camera information, (2) reference virtual plane information and (3') a reference degree of stereoscopic effect, and outputs (5) right virtual camera information, (6) left virtual camera information and (7) distance between the virtual cameras. Namely, when the "real mode" is designated, library for stereoscopic display 218 accepts (3') reference degree of stereoscopic effect instead of (3) parallax assessment plane information.

(3') Reference degree of stereoscopic effect is a parameter for adjusting stereoscopic effect in stereoscopic display on display 10. In the "real mode" according to the present embodiment, setting of right virtual camera 302 and left virtual camera 304 for providing stereoscopic display close to real is made. Depending on a type of an application or a proceeding condition, however, stereoscopic display close to real may not necessarily be desired. In such a case, stereoscopic effect in stereoscopic display is adjusted by setting (3') reference degree of stereoscopic effect as appropriate.

It is noted that these input and output values (including a matrix value) may be held in a variable storage area accessible by any module included in library for stereoscopic display 218 and applications 200A and 200B.

As described above, library for stereoscopic display 218 outputs information indicating a view volume set for each of right virtual camera 302 and left virtual camera 304. Namely, with the program according to the present embodiment, by providing the setting information of the reference virtual camera to library for stereoscopic display 218, setting information of two virtual cameras of right virtual camera 302 and left virtual camera 304 can be obtained.

As described above, library for stereoscopic display 218 according to the present embodiment accepts input of the camera matrix (the projection matrix and the view matrix) defining reference virtual camera 300, as (1) reference virtual camera information. In addition, library for stereoscopic display 218 accepts input of a distance from reference virtual camera 300 to reference virtual plane region 360 as (2) reference virtual plane information. Then, library for stereoscopic display 218 outputs the camera matrix (the projection matrix and the view matrix) defining set right virtual camera 302 as (5) right virtual camera information and outputs the camera matrix (the projection matrix and the view matrix defining set left virtual camera 304 as (6) left virtual camera information.

In addition, library for stereoscopic display 218 according to the present embodiment accepts information for designating the position of the parallax assessment plane in parallel to reference virtual plane region 360, as (3) parallax assessment plane information.

<C. Image Generation Processing>

Details of processing for generating a right image and a left image including processing contents (processing or the like for setting an arrangement position and a view volume of the virtual camera) in library for stereoscopic display 218 will be described hereinafter.

[c1. Overview]

Figure 8:
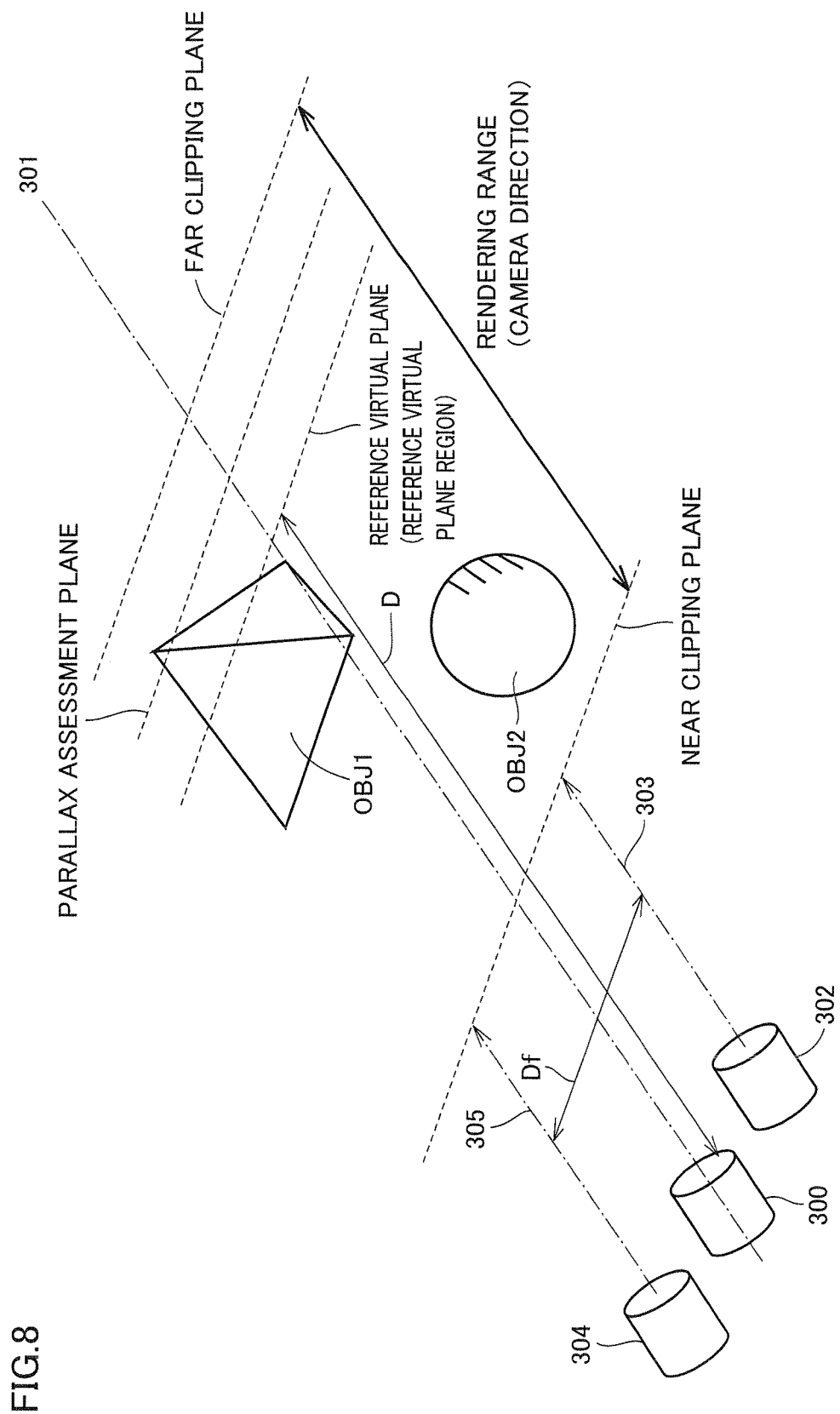
FIG. 8 schematically shows one example of a three-dimensional virtual space to be subjected to object image generation processing according to the present embodiment.
Figure 9:
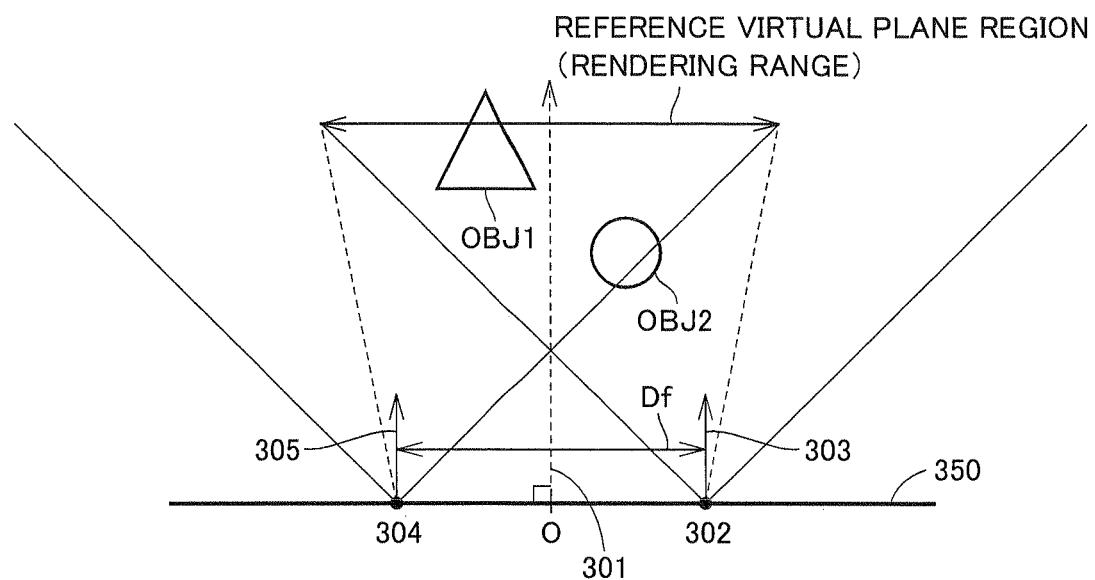
FIG. 9 schematically shows generation processing of an object image (a right object image and a left object image) generated in a state shown in FIG. 8.

As shown in FIGS. 8 and 9, in the present embodiment, basically, stereoscopic display is provided by using a pair of images (stereo images) including a common display target (a subject) and having prescribed parallax. Such a pair of images is dynamically generated by arranging a pair of virtual cameras (right virtual camera 302 and left virtual camera 304) within the three-dimensional virtual space and virtually photographing an object within the three-dimensional virtual space with this pair of virtual cameras. Namely, a pair of images is rendered by using two virtual cameras different in viewpoint for a common object, with a computer graphics technique such as polygon generation.

In the three-dimensional virtual space shown in FIGS. 8 and 9, it is assumed that right virtual camera 302 and left virtual camera 304 are arranged at a distance from each other by a virtual space distance Df With such arrangement, parallax in accordance with this virtual space distance Df is generated between the right image and the left image generated by right virtual camera 302 and left virtual camera 304 respectively.

It is noted that camera direction 303 in which right virtual camera 302 photographs the three-dimensional virtual space is the same as camera direction 305 in which left virtual camera 304 photographs the three-dimensional virtual space. Namely, camera direction 303 is in parallel to camera direction 305.

It is assumed that object OBJ1 and object OBJ2 are arranged in this order, from the side farther from right virtual camera 302 and left virtual camera 304. By way of example, object OBJ1 is assumed as a quadrangular pyramid and object OBJ2 is assumed as a sphere.

Each of right virtual camera 302 and left virtual camera 304 renders only an object within a prescribed range in each camera direction in the three-dimensional virtual space. Namely, right virtual camera 302 renders a range included in the view volume defined by the corresponding viewing angle, the near clipping plane and the far clipping plane, and left virtual camera 304 renders a range included in the view volume defined by the corresponding viewing angle, the near clipping plane and the far clipping plane.

In addition, within the three-dimensional virtual space, the reference virtual plane and the reference virtual plane region which is a partial region on the reference virtual plane are set. This reference virtual plane (or the reference virtual plane region) is a plane (or a region) corresponding to a position on the display surface of display 10 as described above, and it is set perpendicular to any of camera direction 303 and camera direction 305. This reference virtual plane region defines a position and a region within the three-dimensional virtual space, of which presence the user feels around the display surface of display 10 when stereoscopic display is provided on display 10.

Figure 10:
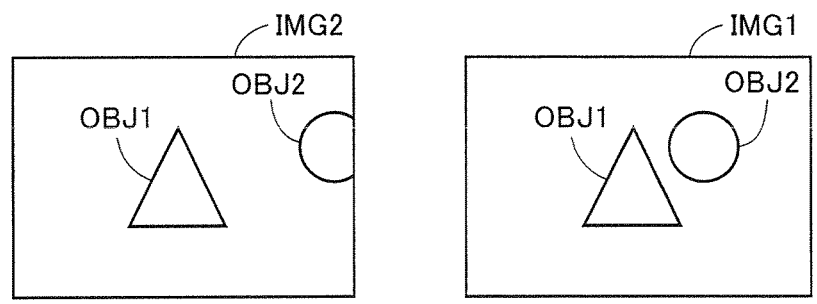
FIG. 10 shows one example of object images generated by a right virtual camera and a left virtual camera shown in FIG. 9, respectively.

When the rendering range (view volume) is thus set, right virtual camera 302 and left virtual camera 304 generate images as shown in FIG. 10, respectively. FIG. 10 illustrates a right image IMG1 generated as a result of virtual photographing by right virtual camera 302 in the three-dimensional virtual space as shown in FIGS. 8 and 9 and a left image IMG2 as a result of virtual photographing by left virtual camera 304 therein.

When right image IMG1 and left image IMG2 are compared with each other, a position where object OBJ1 is present within right image IMG1 substantially matches with a position of object OBJ1 within left image IMG2. In contrast, a position of object OBJ2 within right image IMG1 is different from a position where object OBJ2 is present within left image IMG2. Namely, a user facing display 10 visually recognizes object OBJ1 with no parallax, while he/she visually recognizes object OBJ2 with a certain amount of parallax.

In other words, as shown in FIG. 8, since the reference virtual plane (reference virtual plane region) is set within the three-dimensional virtual space at a position passing through object OBJ1, how object OBJ1 is displayed is identical between the right image and the left image. Consequently, there is substantially no parallax for object OBJ1 on the display surface of display 10, and for the user, a space around object OBJ1 just looks like present around the display surface of display 10.

As described above, it is considered as general that an object to desirably be visually recognized by the user (object OBJ1 in the example described above) is stereoscopically displayed as if it were located around the display surface of display 10. In order to thus stereoscopically display an object to desirably be visually recognized by the user, right virtual camera 302 and left virtual camera 304 should be set within the three-dimensional virtual space, and in succession the reference virtual plane should be set at a position in accordance with a position of the object to desirably be displayed around the display surface of display 10, in a manner perpendicular to camera direction 303 and left camera direction 305.

In the present embodiment, from a point of view of lessening processing load in rendering involved with an object, a rendering range (view volume) of each of right virtual camera 302 and left virtual camera 304 is set with the reference virtual plane region serving as the reference. As shown in FIG. 9, in a case where right virtual camera 302 and left virtual camera 304 are set on reference line 350 passing through these virtual cameras at a distance from each other by virtual space distance Df, each of right virtual camera 302 and left virtual camera 304 can render the view volume with its arrangement position serving as the reference. In the present embodiment, the rendering range with the reference virtual plane region serving as the reference is set. Namely, for right virtual camera 302, a view volume defined by an arrangement position thereof and an outer perimeter of the reference virtual plane region is set as the rendering range. For left virtual camera 304 as well, a view volume defined by an arrangement position thereof and an outer perimeter of the reference virtual plane region is set as the rendering range.

By thus setting the respective view volumes defined by the outer perimeter of the reference virtual plane region for right virtual camera 302 and left virtual camera 304, the right image and the left image generated by right virtual camera 302 and left virtual camera 304 respectively can be used for stereoscopic display on display 10 as they are. More specifically, the right image output from right virtual camera 302 is written in first VRAM 112 (FIG. 5) as it is, while the left image output from left virtual camera 304 is written in second VRAM 122 (FIG. 5) as it is. Thus, in the present embodiment, an (extra) image in a range not used for display on display 10 is not generated. Therefore, unnecessary rendering processing can be avoided.

Meanwhile, when an object arranged within the three-dimensional virtual space, to desirably be visually recognized by the user, is stereoscopically displayed on display 10, fields of view (view volumes) different from each other should be set for right virtual camera 302 and left virtual camera 304, respectively. Therefore, a creator of an application including stereoscopic display should appropriately designate respective setting values (such as an arrangement position, a view volume and the like) for the right virtual camera and the left virtual camera, in accordance with an object to desirably be visually recognized by the user, in each scene associated with proceeding of the application. Such an operation imposes great load on the creator and may impede creation of an application utilizing stereoscopic display.

The program according to the present embodiment (typically mounted as library for stereoscopic display 218 described above) provides a function for allowing automatic setting of various parameters necessary for providing stereoscopic display, simply by designating a parameter similar to that in an application utilizing only two-dimensional display (not utilizing stereoscopic display) as shown in FIG. 1A.

More specifically, as in the application utilizing only two-dimensional display, a creator sets single reference virtual camera 300 (see FIG. 1B) at a position in accordance with an object to be displayed on display 10. It is noted that a setting value for this reference virtual camera includes setting values for an arrangement position of reference virtual camera 300 and a corresponding view volume. In addition to such setting items, the creator sets as the reference virtual plane, a position where an object to be displayed around the display surface of display 10 is present. Then, a region included inside the view volume of the reference virtual camera in the reference virtual plane is determined as reference virtual plane region 360.

Then, the program according to the present embodiment calculates the respective arrangement positions, the view volumes and the like of right virtual camera 302 and left virtual camera 304 based on the setting as described above. Through such processing, the creator of the application utilizing stereoscopic display can stereoscopically display an intended range within the three-dimensional virtual space on display 10, with workload as much as in creation of an application utilizing only two-dimensional display. In addition, since an object present around reference virtual plane region 360 is displayed on the display surface of display 10 with no parallax or a little parallax, the user who plays the application can most readily visually recognize that object. Moreover, since it is ensured that the region set as reference virtual plane region 360 is reliably displayed on display 10, the creator of the application should only take into account reference virtual camera 300 and reference virtual plane region 360, without considering respective setting values and the like for right virtual camera 302 and left virtual camera 304. Therefore, creation of an application is facilitated.

Further, depending on contents in an application, real display of a state of the three-dimensional virtual space to the user may be desired. Namely, it may also be effective to give the user feeling as if he/she were present in the three-dimensional virtual space. In this case, owing to stereoscopic display on display 10, the user will feel as if an actual display target were really present at the site.

As described above, depending on contents or proceeding of an application, such need as how stereoscopic display should be provided to the user is different. Therefore, in the program according to the present embodiment, at least two modes (the "application-priority mode" and the "real mode" described above) are prepared. Then, as the creator of the application designates any mode to be used, respective setting values for right virtual camera 302 and left virtual camera 304 in accordance with that mode are automatically determined.

Details of processing for determining respective setting values for right virtual camera 302 and left virtual camera 304 in each mode will be described hereinafter.

[c2. Application-Priority Mode]

In the "application-priority mode," the creator of the application designates an arrangement position and a view volume (rendering range) of a single reference virtual camera (reference virtual camera 300 shown in FIG. 1B) as in creation of an application utilizing only two-dimensional display (not utilizing stereoscopic display) ((1) reference virtual camera information shown in FIG. 7). At the same time, the creator designates which two-dimensional position within a space included in the designated view volume is desirably displayed to be located around the display surface in stereoscopic display on display 10 ((2) reference virtual plane information shown in FIG. 7). In addition, the creator evaluates an amount of parallax generated between the right image and the left image and designates a parallax assessment plane for ensuring that the user can comfortably accept stereoscopic display on display 10 ((3) parallax assessment plane information shown in FIG. 7).

In response to this designation, library for stereoscopic display 218 sets right virtual camera 302 and left virtual camera 304 such that parallax generated between the right image generated by right virtual camera 302 and the left image generated by left virtual camera 304 does not exceed a predetermined value, as will be described hereinafter in detail. Then, library for stereoscopic display 218 outputs (5) right virtual camera information for defining set right virtual camera 302 and (6) left virtual camera information for defining set left virtual camera 304, and outputs (7) distance between the virtual cameras indicating positional relation between right virtual camera 302 and left virtual camera 304.

(c2-i. Projection Matrix and View Matrix)

In the description below, an example where (1) reference virtual camera information, (5) right virtual camera information and (6) left virtual camera information are all defined as a camera matrix is shown. This camera matrix will now be described.

This camera matrix represents one example of a method of defining a field of view (view volume) of a virtual camera, and it typically includes a view matrix (3 rows×4 columns) for converting a three-dimensional virtual space in a direction viewed from the virtual camera and a projection matrix (4 rows×4 columns) for projection on a two-dimensional screen (projection plane).

As shown in FIG. 11, a certain three-dimensional virtual space is defined by three axes of X, Y and Z. A coordinate of the virtual camera is assumed as (cx, cy, cz), and a coordinate of a focused point (an intersection of a direction of the virtual camera and the reference virtual plane) is assumed as (bx, by, bz). In addition, a distance from the virtual camera to the near clipping plane is assumed as n, and a distance from the virtual camera to the far clipping plane is assumed as f. Moreover, a vector indicating an orientation of the virtual camera is defined as a front direction vector (Zx, Zy, Zz), an upward vector (Yx, Yy, Yz), and a left direction vector (Xx, Xy, Xz). It is noted that each of these vectors is a unit vector of which magnitude is "1".

A projection matrix in the case shown in FIG. 11 is shown as expression (1), and a view matrix is shown as expression (2).

$$\begin{bmatrix} \frac{2 \times n}{x2 - x1} & 0 & \frac{x2 + x1}{x2 - x1} & 0 \\ 0 & \frac{2 \times n}{y1 - y2} & \frac{y1 + y2}{y1 - y2} & 0 \\ 0 & 0 & \frac{-(f+n)}{f-n} & \frac{-2 \times f \times n}{f-n} \\ 0 & 0 & -1 & 0 \end{bmatrix} \quad (1)$$

$$\begin{bmatrix} -Xx & -Xy & -Xz & cx \times Xx + cy \times Xy + cz \times Xz \\ Yx & Yy & Yz & -cx \times Yx - cy \times Yy - cz \times Yz \\ -Zx & -Zy & -Zz & cx \times Zx + cy \times Zy + cz \times Zz \end{bmatrix} \quad (2)$$

By using such a camera matrix (a projection matrix and a view matrix), adaptation to a three-dimensional virtual space set for each application can be achieved. Namely, the camera matrix is a matrix defined in a versatile dimension, and processing for setting a virtual camera as described above can be performed without depending on an application.

Though a method of generating a projection matrix using a coordinate of a virtual camera and a coordinate of a focused point has been exemplified in FIG. 11, a projection matrix can be generated by using a direction of illumination and a virtual camera orientation vector.

In addition, though a method of generating a view matrix using positions of four sides (a size) defining the near clipping plane has been exemplified in FIG. 11, a view matrix can also be generated based on an angle of view of a virtual camera.

It is noted that both of a projection matrix and a view matrix can be converted bidirectionally. For example, regarding the projection matrix, the projection matrix can also be generated based on a coordinate of a virtual camera and a coordinate of a focused point, whereas a coordinate of a virtual camera and a coordinate of a focused point can also be calculated from the projection matrix.

Therefore, when respective arrangement positions and view volumes of right virtual camera 302 and left virtual camera 304 in accordance with set reference virtual camera 300 are set in accordance with a method as shown in FIGS. 12A to 12C, 13A to 13D, and 14A to 14C which will be described later, a camera matrix (a projection matrix and a view matrix) of each of right virtual camera 302 and left virtual camera 304 is output based on such information.

(c2-ii. Reference Virtual Plane)

As shown in FIG. 8, the reference virtual plane is set with reference virtual camera 300 serving as the reference. In the description below, an example where a virtual space distance D from reference virtual camera 300 to the reference virtual plane along a camera direction 301 of reference virtual camera 300 (reference camera direction) is defined as (2) reference virtual plane information is shown.

(c2-iii. Parallax Assessment Plane)

FIGS. 12A to 12C and 13A to 13D show examples where a parallax assessment plane 361 is set on the side opposite to reference virtual camera 300, with respect to reference virtual plane region 360. More specifically, examples where parallax assessment plan 361 is set as a position corresponding to a depth allowing the user who views display 10 to comfortably accept stereoscopic display are shown. Namely, since a display target located at reference virtual plane region 360 in the three-dimensional virtual space is displayed around the display surface of display 10, the display target located on parallax assessment plane 361 is seen on the rear side relative to the display surface of display 10. Regarding a portion corresponding to parallax assessment plane 361 in the right image and the left image, an amount of parallax in accordance with positional relation between right virtual camera 302 and left virtual camera 304 is generated. As this amount of parallax relatively increases, load imposed on the user who views display 10 increases. Therefore, right virtual camera 302 and left virtual camera 304 should be set such that parallax at parallax assessment plane 361 does not exceed a prescribed threshold value.

Though FIGS. 12A to 12C and 13A to 13D show examples where parallax assessment plane 361 is provided opposite to reference virtual camera 300 with respect to reference virtual plane region 360, it may be set on the side of reference virtual camera 300. In this case, parallax assessment plane 361 is set at a position corresponding to such an amount of image pop-up that the user who views display 10 can comfortably accept stereoscopic display.

In addition, a first parallax assessment plane may be set on a farther side relative to reference virtual plane region 360 and a second parallax assessment plane may be set on a nearer side relative to reference virtual plane region 360, and then whether a condition at each parallax assessment plane is satisfied or not may be evaluated.

In any case, the parallax assessment plane is arranged in parallel to reference virtual plane region 360 and used to evaluate parallax generated between the right image generated by right virtual camera 302 and the left image generated by left virtual camera 304. Namely, by maintaining parallax for a display target present on parallax assessment plane 361 to a prescribed threshold value or lower, it is ensured that stereoscopic display of at least an object present between reference virtual plane region 360 and parallax assessment plane 361 is comfortably accepted by the user.

A limit value of the parallax on this parallax assessment plane 361 is determined by a physical size and characteristics of information processing system 1 (display 10), physical characteristics dependent on the user, and the like. More specifically, the limit value of the parallax is dependent on a display size of display 10 (a vertical length and a horizontal length), a size of each pixel, an interval in a parallax barrier, an interval between the user's eyes (an actual distance L1 shown in FIG. 4), a distance from the user to the display surface of display 10 (an actual distance L2 shown in FIG. 4), and the like.

Figure 12A:
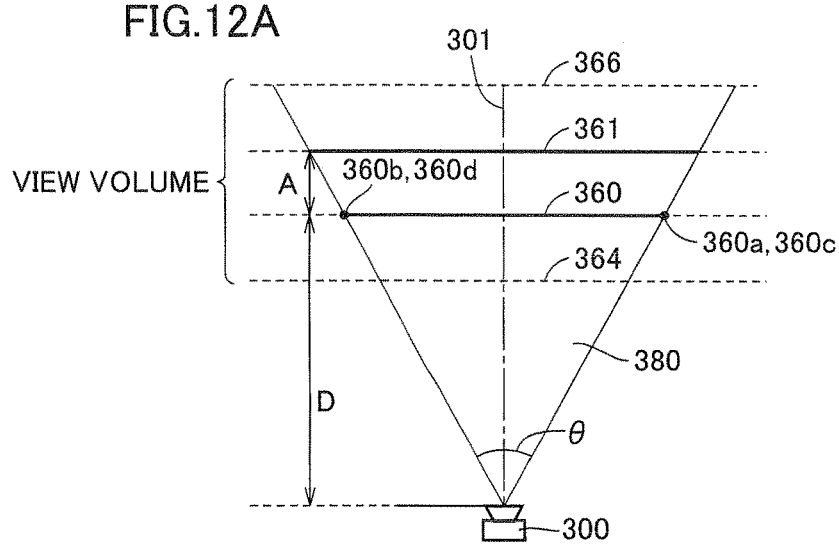
FIGS. 12A to 12C are diagrams for two-dimensionally illustrating processing for setting the right virtual camera and the left virtual camera according to the present embodiment.

In the description below, an example where (3) parallax assessment plane information is defined as a virtual space distance A from reference virtual plane region 360 to parallax assessment plane 361 as shown in FIG. 12A is shown.

It is noted that (2) reference virtual plane information and (3) parallax assessment plane information are not limited to those described above, and a virtual space distance from reference virtual camera 300 to parallax assessment plane 361 may be defined and then a virtual space distance from reference virtual camera 300 to reference virtual plane region 360 may be provided as a ratio with the virtual space distance from reference virtual camera 300 to parallax assessment plane 361 serving as the reference.

(c2-iv. Processing for Setting Right Virtual Camera and Left Virtual Camera)

How right virtual camera 302 and left virtual camera 304 are set in response to setting of reference virtual camera 300 will now be described with reference to FIGS. 12A to 12C and 13A to 13D.

Referring to FIG. 12A, initially, it is assumed that designation to set reference virtual camera 300 at a certain position in the three-dimensional virtual space has been made. At the same time, it is assumed that designation to set reference virtual plane region 360 at a position distant from reference virtual camera 300 by virtual space distance D and to set parallax assessment plane 361 at a position distant from reference virtual plane region 360 by virtual space distance A has been made.

When the virtual space distance between reference virtual camera 300 and reference virtual plane region 360 is provided, as shown in FIG. 12A, reference virtual plane region 360 is determined as a plane region orthogonal to the camera direction of reference virtual camera 300 that is included in view volume 380 of this reference virtual camera 300. This view volume 380 corresponds to a range effectively rendered by reference virtual camera 300 in the three-dimensional virtual space.

More specifically, view volume 380 corresponds to a frustum obtained by dividing a quadrangular pyramid having a viewing angle of reference virtual camera 300 as a vertex by a near clipping plane 364 and a far clipping plane 366. Namely, view volume 380 is defined by the viewing angle of reference virtual camera 300, near clipping plane 364 corresponding to the plane on the side closest to reference virtual camera 300, and far clipping plane 366 corresponding to the plane on the side farthest from reference virtual camera 300. In other words, view volume 380 is inscribed at each vertex 360a, 360b, 360c, 360d defining reference virtual plane region 360.

Respective positions of a right maximum parallax plane 362 and a left maximum parallax plane 363 are determined on a plane including parallax assessment plane 361, from the state shown in FIG. 12A. This right maximum parallax plane 362 is a range rendered by left virtual camera 304 in a case where parallax on parallax assessment plane 361 is set as the limit value. Similarly, this left maximum parallax plane 363 is a range rendered by right virtual camera 302 in a case where parallax on parallax assessment plane 361 is set as the limit value.

Figure 12B:
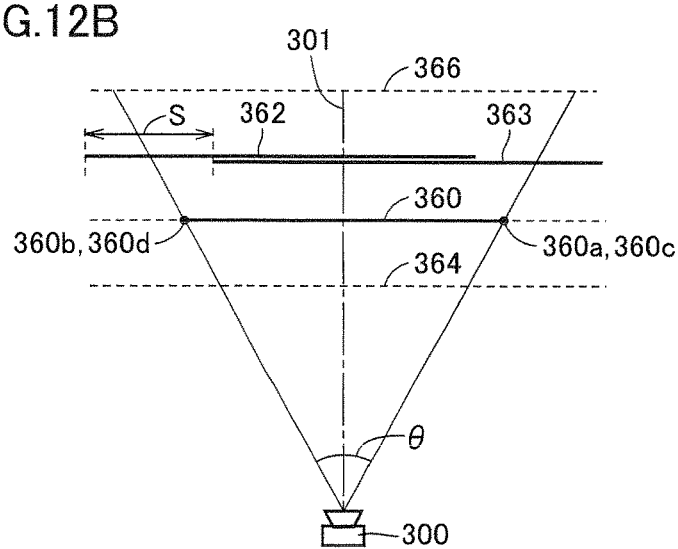

More specifically, respective positions of right maximum parallax plane 362 and left maximum parallax plane 363 are determined such that an amount of displacement between right maximum parallax plane 362 and left maximum parallax plane 363 matches with parallax tolerable on parallax assessment plane 361 (a maximum value corresponding to the parallax limit amount). As shown in FIG. 12B, by sliding parallax assessment plane 361 toward the left over the sheet surface and toward the right over the sheet surface, right maximum parallax plane 362 and left maximum parallax plane 363 are obtained. Here, a virtual space distance S representing a distance between right maximum parallax plane 362 and left maximum parallax plane 363 corresponds to the parallax limit amount on the display surface of display 10.

Figure 12C:
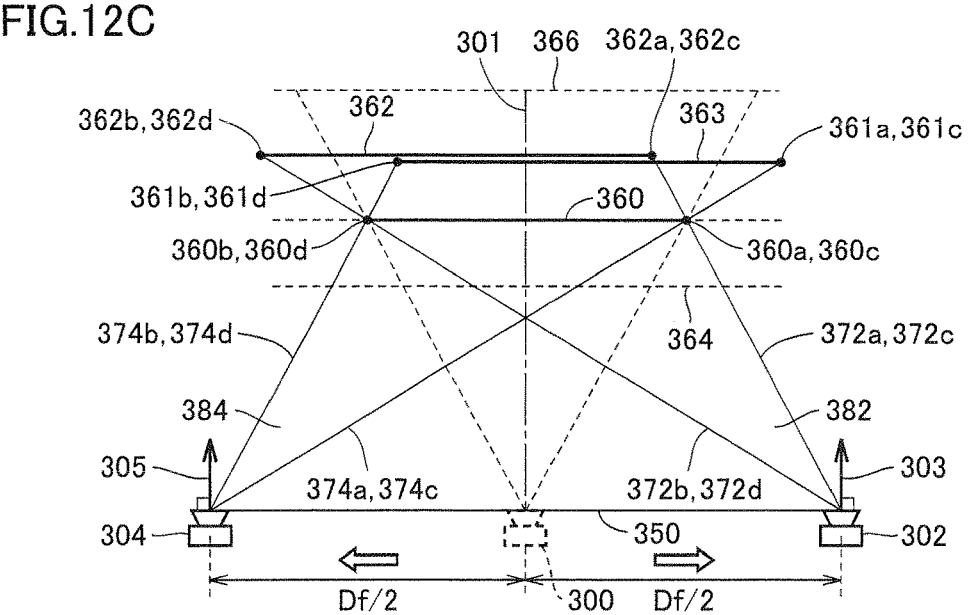
Figure 13A:
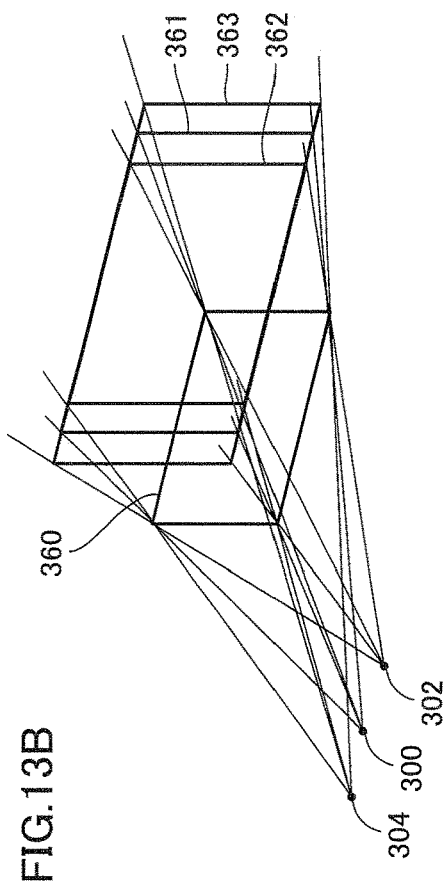
FIGS. 13A to 13D show a view volume set in accordance with a result of processing in the processing for setting the right virtual camera and the left virtual camera shown in FIGS. 12A to 12C.
Figure 13B:
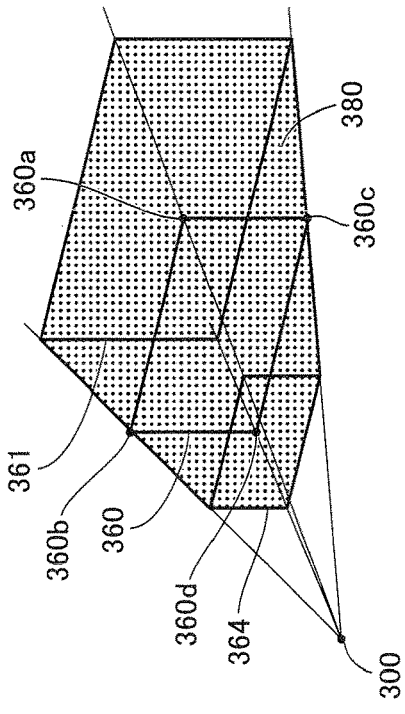
Figure 13C:
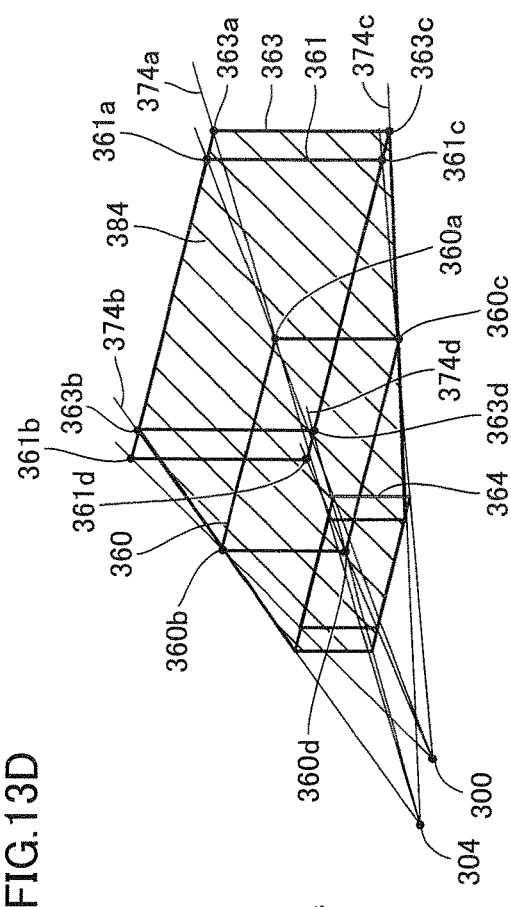
Figure 13D:
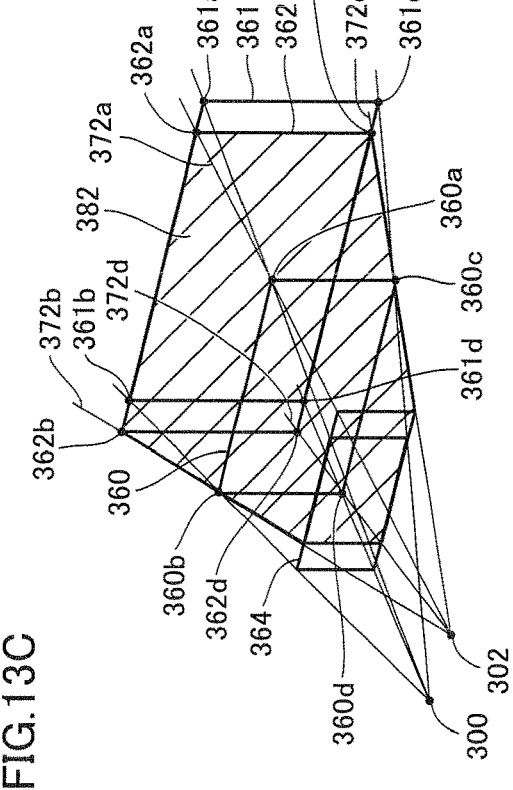

Based on reference virtual plane region 360 and right maximum parallax plane 362 and left maximum parallax plane 363 of which positions are determined in the procedure as described above, respective arrangement positions of right virtual camera 302 and left virtual camera 304 are determined. In the present embodiment, as shown in FIG. 12C, reference line 350 passing through reference virtual camera 300 and extending in parallel to reference virtual plane region 360 is defined, and right virtual camera 302 and left virtual camera 304 are set on this reference line 350. More specifically, right virtual camera 302 is set at a position at which the view volume including reference virtual plane region 360 and right maximum parallax plane 362 can be defined. Similarly, left virtual camera 304 is set at a position where the view volume including reference virtual plane region 360 and left maximum parallax plane 363 can be defined.

Expressing the processing for setting the virtual camera described above with reference to FIG. 12C from a different point of view, in response to setting of reference virtual camera 300 within the three-dimensional virtual space, library for stereoscopic display 218 sets right virtual camera 302 and left virtual camera 304 such that camera direction 303 of right virtual camera 302 and camera direction 305 of left virtual camera 304 are the same as reference camera direction 301 which is the camera direction of reference virtual camera 300. Here, library for stereoscopic display 218 sets reference virtual plane region 360, which is perpendicular to reference camera direction 301 and is a virtual plane region included in view volume 380 of reference virtual camera 300, as the display target region.

In addition, library for stereoscopic display 218 carries out at least one of setting right virtual camera 302 at a position resulted from movement of the arrangement position of reference virtual camera 300 toward the right along a direction perpendicular to reference camera direction 301 and setting of left virtual camera 304 resulted from movement of the arrangement position of reference virtual camera 300 toward the left along a direction perpendicular to reference camera direction 301.

FIG. 12C shows an example where library for stereoscopic display 218 sets right virtual camera 302 at a position resulted from movement of the arrangement position of reference virtual camera 300 by a prescribed distance toward the right along a direction perpendicular to reference camera direction 301 and sets left virtual camera 304 resulted from movement of the arrangement position of reference virtual camera 300 by a prescribed distance toward the left along a direction perpendicular to reference camera direction 301.

Namely, right virtual camera 302 is set at a position resulted from movement of the arrangement position of reference virtual camera 300 toward the right along reference line 350, and left virtual camera 304 is set at a position resulted from movement of the arrangement position of reference virtual camera 300 toward the left along reference line 350. In the example shown in FIG. 12C, right virtual camera 302 is set at a position resulted from movement of the arrangement position of reference virtual camera 300 toward the right by Df/2 along reference line 350, and left virtual camera 304 is set at a position resulted from movement of the arrangement position of reference virtual camera 300 toward the left by the same distance of Df/2 along reference line 350.

It is noted that FIG. 14C which will be described later shows an example where the left virtual camera is set at the position the same as the arrangement position of reference virtual camera 300 and the right virtual camera is set at the position set by moving the arrangement position of reference virtual camera 300 by a prescribed distance toward the right along the direction perpendicular to reference camera direction 301.

Turning to respective view volumes of right virtual camera 302 and left virtual camera 304 set as described above, as shown in FIGS. 13B to 13D, respective view volumes of right virtual camera 302 and left virtual camera 304 are set such that a range of reference virtual plane region 360 (cross-sectional region) included in view volume 380 of reference virtual camera 300 is maintained.

Namely, library for stereoscopic display 218 sets view volume 382 of right virtual camera 302 and view volume 384 of left virtual camera 304 such that a cross-section at a position corresponding to reference virtual plane region 360 in view volume 382 of right virtual camera 302 coincides with a cross-section at a position corresponding to reference virtual plane region 360 in view volume 384 of left virtual camera 304.

Expressing the setting of the view volume described above from a different point of view, library for stereoscopic display 218 obtains respective positions of four vertices 360a, 360b, 360c, and 360d of reference virtual plane region 360 included in view volume 380 of reference virtual camera 300. Then, library for stereoscopic display 218 sets view volume 382 of right virtual camera 302 by using straight lines 372a, 372b, 372c, and 372d extending from the position of right virtual camera 302 toward a plurality of vertices 360a, 360b, 360c, and 360d, respectively. Here, straight lines 372a, 372b, 372c, and 372d are set to intersect with vertices 362a, 362b, 362c, and 362d of right maximum parallax plane 362, respectively.

Similarly, library for stereoscopic display 218 defines view volume 384 of left virtual camera 304 by using straight lines 374a, 374b, 374c, and 374d extending from the position of left virtual camera 304 toward the plurality of vertices 360a, 360b, 360c, and 360d, respectively. Here, straight lines 374a, 374b, 374c, and 374d are set to intersect with vertices 363a, 363b, 363c, and 363d of left maximum parallax plane 363, respectively.

The camera directions of right virtual camera 302 and left virtual camera 304 thus set are both maintained in parallel to reference camera direction 301 of reference virtual camera 300. Consequently, the camera directions of right virtual camera 302 and left virtual camera 304 are both orthogonal to reference line 350.

[c2-v. Variation of Processing for Setting Right Virtual Camera and Left Virtual Camera]

In the description above, in setting the right virtual camera and the left virtual camera, processing for moving the arrangement position of reference virtual camera 300 along reference line 350 toward the right and the left by an equal distance has been exemplified, however, any one virtual camera may be fixed at the arrangement position of reference virtual camera 300 and the other virtual camera alone may be moved. Processing in such a case will be exemplified hereinafter.

Figure 14A:
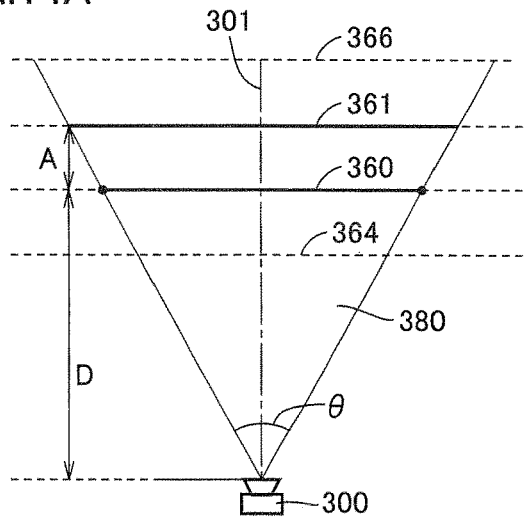
FIGS. 14A to 14C are diagrams for two-dimensionally illustrating processing for setting the right virtual camera and the left virtual camera according to a variation of the present embodiment.
Figure 14B:
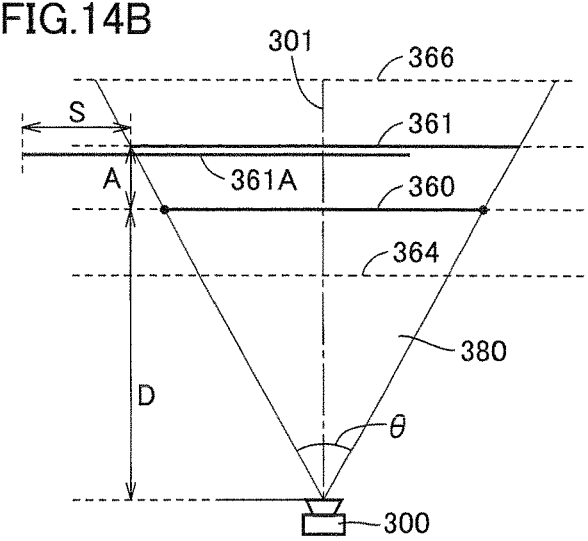

Referring to FIG. 14A, it is assumed that reference virtual camera 300 is set at a certain position in a three-dimensional virtual space. In this state, the right maximum parallax plane and the left maximum parallax plane in a case where parallax on parallax assessment plane 361 is set as the limit value are determined. In this case, unlike FIG. 12B above, a position of a right maximum parallax plane 361A for setting a position of one virtual camera (in the example shown in FIG. 14B, a right virtual camera 300A) is calculated while parallax assessment plane 361 corresponding to reference virtual camera 300 is fixed. Namely, as shown in FIG. 14B, by sliding parallax assessment plane 361 toward the left over the sheet surface, right maximum parallax plane 361A is obtained. Here, virtual space distance S between parallax assessment plane 361 and right maximum parallax plane 361A corresponds to the parallax limit amount.

Figure 14C:
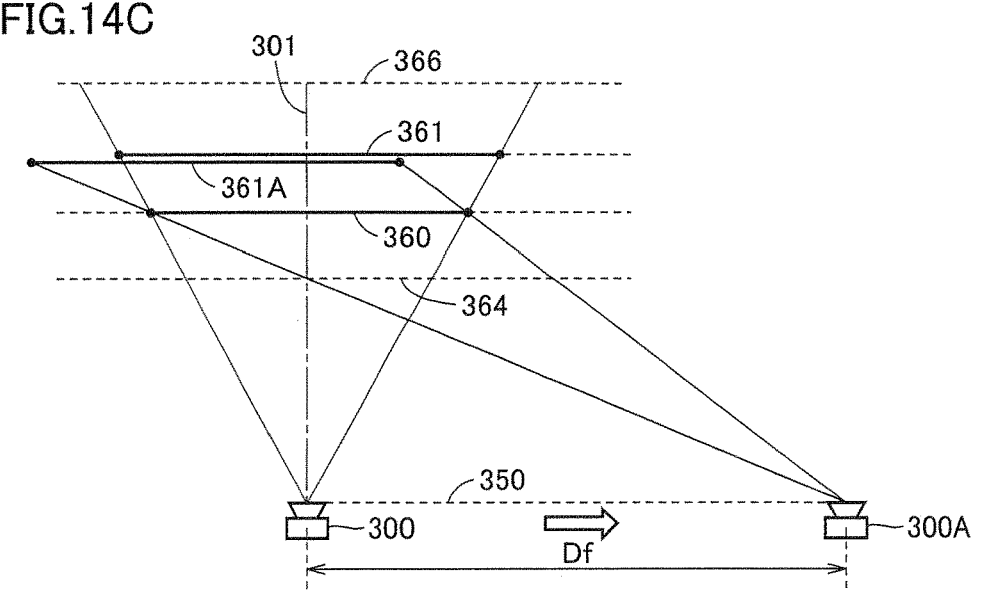

Finally, as shown in FIG. 14C, reference line 350 passing through reference virtual camera 300 and extending in parallel to the reference virtual plane is defined, and right virtual camera 300A is set on this reference line 350. More specifically, right virtual camera 300A is set at a position where a view volume including reference virtual plane region 360 and right maximum parallax plane 361A can be defined. Then, right virtual camera 300A and reference virtual camera 300 are used to generate the right image and the left image respectively.

According to the method as shown in FIGS. 14A to 14C, a viewpoint stereoscopically displayed on the display surface of display 10 moves from reference virtual camera 300 to a point intermediate between right virtual camera 300A and reference virtual camera 300. For example, in a case of a user whose "dominant eye" is known (the left eye in the example shown in FIGS. 14A to 14C), by setting positions of a pair of virtual cameras with the method as shown in FIGS. 14A to 14C, switch from two-dimensional display to stereoscopic display can be accepted with less uncomfortableness.

Though a configuration where right virtual camera 300A is set by moving reference virtual camera 300 toward the right has been described in the example shown in FIGS. 14A to 14C, right virtual camera 300A may be set at the position of reference virtual camera 300 and reference virtual camera 300 may be moved toward the left to set a left virtual camera.

[c3. Real Mode]

In the "real mode", the creator of the application designates an arrangement position and a view volume (rendering range) of a single reference virtual camera (reference virtual camera 300 shown in FIG. 1B) ((1) reference virtual camera information shown in FIG. 7), as in creation of an application utilizing only two-dimensional display (not utilizing stereoscopic display). At the same time, the creator designates which two-dimensional position within a space included in the designated view volume is desirably displayed to be located around the display surface in stereoscopic display on display 10 ((2) reference virtual plane information shown in FIG. 7).

In addition, the creator designates a reference degree of stereoscopic effect for adjusting stereoscopic effect in stereoscopic display ((3') reference degree of stereoscopic effect shown in FIG. 7). Namely, in the real mode, (3) parallax assessment plane information as in the application-priority mode described above is not necessary, but instead (3') reference degree of stereoscopic effect is input. As described above, (3') reference degree of stereoscopic effect is used in indicating adjustment of stereoscopic effect in stereoscopic display when stereoscopic display close to real may not necessarily be desired, depending on a type of an application or a proceeding condition. Typically, the reference degree of stereoscopic effect is given as a coefficient taking a value from "0" to "1" When "1" is set, right virtual camera 302 and left virtual camera 304 are set such that stereoscopic display close to real can be provided. As the value is closer to "0", right virtual camera 302 and left virtual camera 304 are set such that stereoscopic display with weaker stereoscopic effect is provided.

In response to such designation, library for stereoscopic display 218 sets right virtual camera 302 and left virtual camera 304 such that a virtual space distance between the virtual cameras does not exceed a tolerable maximum value, as will be described below in detail. The tolerable maximum value for the virtual space distance is a value obtained by multiplying a virtual space distance between the virtual cameras for stereoscopic display close to real by a reference degree of stereoscopic effect.

(c3-i. Processing for Setting Right Virtual Camera and Left Virtual Camera)

Figure 15A:
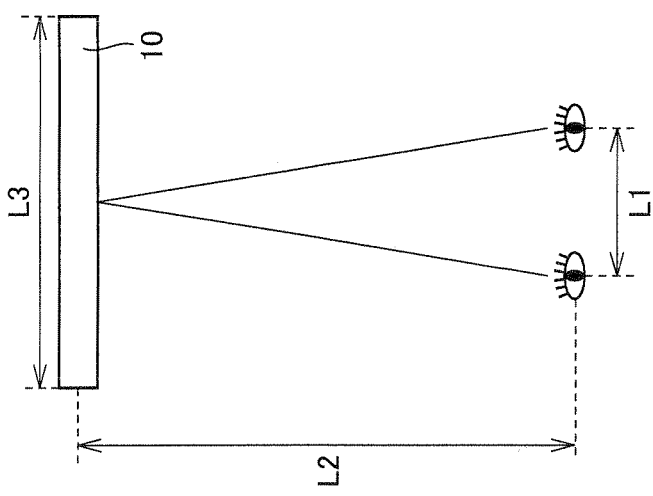
FIGS. 15A to 15C are diagrams for illustrating processing contents in a real mode according to the present embodiment.
Figure 15B:
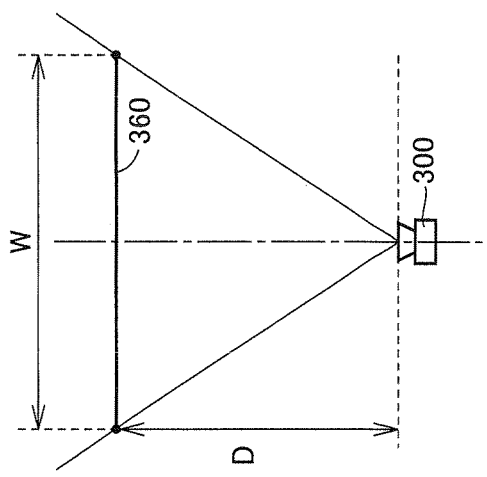
Figure 15C:
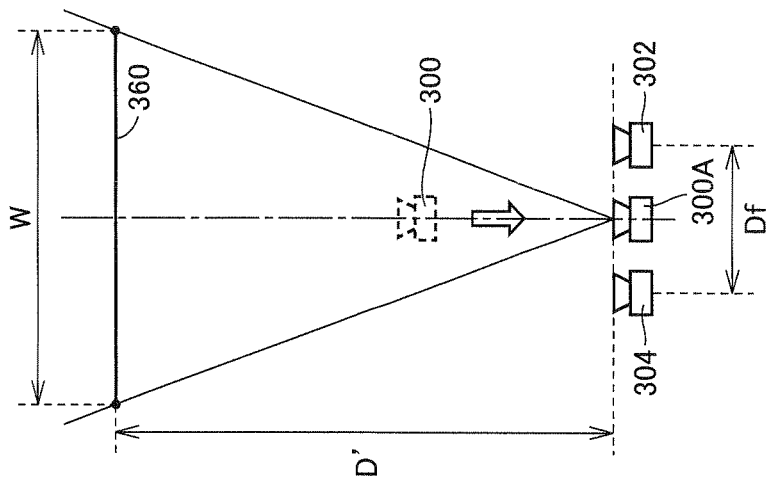

FIGS. 15A to 15C are diagrams for illustrating processing contents in the real mode according to the embodiment of the present invention. In this real mode, as shown in FIG. 15A, rendering processing is performed so as to be equivalent to optical relation in a case where the user views the display surface in a manner facing display 10. Namely, respective arrangement positions and view volumes of the right virtual camera and the left virtual camera are determined in correspondence with positional relation defined by actual distance L1 between the user's right eye and left eye, actual distance L2 from the user's eyes to the display surface of display 10, and an actual screen width L3 of the display surface of display 10.

It is noted that (1) reference virtual camera information and (2) reference virtual plane information input in the real mode are basically used for designating reference virtual plane region 360 to be rendered. Namely, respective positions of reference virtual camera 300 as well as right virtual camera 302 and left virtual camera 304 set in connection therewith may be changed from positions set by the application.

For example, as shown in FIG. 15B, a case where reference virtual plane region 360 is set at a position at a distance from reference virtual camera 300 by virtual space distance D is considered. In this case, based on the view volume set for reference virtual camera 300 and virtual space distance D, a range of reference virtual plane region 360 is determined. Here, a width corresponding to a lateral direction of the display surface of reference virtual plane region 360 is assumed as a virtual space distance W.

Then, a position and a view volume of reference virtual camera 300 are adjusted such that a range (within the three-dimensional virtual space) of this reference virtual plane region 360 corresponds to a(n actual) size of the display surface of display 10. More specifically, a virtual space distance D' from reference virtual plane region 360 to reference virtual camera 300 is determined such that relation of "actual distance L2: virtual space distance D'=actual screen width L3 of display surface:virtual space distance W" is satisfied. Here, as shown in FIG. 15C, since a size of reference virtual plane region 360 is maintained constant, a field of view (view volume) of reference virtual camera 300 is set again as a distance from reference virtual plane region 360 is changed.

Thus, the tolerable maximum value of the virtual space distance between right virtual camera 302 and left virtual camera 304 is determined in accordance with the actual distance between the user and the display surface of display 10.

After reference virtual camera 300 is set again, right virtual camera 302 and left virtual camera 304 are set such that a virtual space distance between these virtual cameras corresponds to the actual interval between the user's eyes. More specifically, virtual space distance Df is determined such that relation of "actual distance L2: virtual space distance D'=actual distance L1: virtual space distance Df" is satisfied. This virtual space distance Df corresponds to a theoretical maximum value tolerable in a case where the user views the display surface in a manner facing display 10, for providing stereoscopic display close to real on display 10. Then, a value obtained by multiplying this virtual space distance Df by the reference degree of stereoscopic effect is determined as the virtual space distance between right virtual camera 302 and left virtual camera 304. More specifically, respective positions of right virtual camera 302 and left virtual camera 304 are determined such that these virtual cameras are distant from each other by this determined virtual space distance, with reference virtual camera 300 lying therebetween.

Through such processing, in display of the three-dimensional virtual space of which display to the user is intended by the creator of the application, expression as if an actual object were really present on display 10 can be provided.

Namely, by setting right virtual camera 302 and left virtual camera 304 as described above, positional relation between reference virtual camera 300 in the three-dimensional virtual space and an object around reference virtual plane region 360 substantially matches with positional relation between the user's eyes in a real space and the display surface of display 10. Therefore, display as if a virtual space were seen through a window having a frame as large as a screen of display 10 can be provided.

[c4. Stereoscopic Effect Adjustment]

Virtual space distance Df between right virtual camera 302 and left virtual camera 304 determined in the application-priority mode and the real mode described above is not necessarily used as it is, but it may be used after subsequent further adjustment based on a prescribed condition (a value tolerable by an application, a user's operation, or the like). In that case, virtual space distance Df exhibits a maximum value between right virtual camera 302 and left virtual camera 304 under a condition given by an application or the like. Namely, virtual space distance Df between right virtual camera 302 and left virtual camera 304 is a parameter determining maximum parallax that could be generated between a right image and a left image displayed on display 10, and a maximum value thereof is restricted in accordance with a parallax limit amount under a condition set by an application or the like.

Virtual space distance Df between right virtual camera 302 and left virtual camera 304 is in proportion to a degree of stereoscopic effect that can be felt by the user who views display 10. In other words, if this virtual space distance Df is "0", that is, if right virtual camera 302 and left virtual camera 304 are set at the same position, the subject is displayed on display 10 two-dimensionally rather than stereoscopically.

From a point of view of user-friendliness, a degree of stereoscopic effect determined by the processing as described above is preferably adjustable in accordance with a user's operation. Namely, a virtual space distance between right virtual camera 302 and left virtual camera 304 can preferably be increased and decreased by a user's operation, in a range up to virtual space distance Df (maximum value) between right virtual camera 302 and left virtual camera 304 determined by the processing as described above.

A mechanism for accepting such a user's operation is preferably a mechanism for accepting a user's operation as a one-dimensional parameter value associated with a degree of stereoscopic effect. Forms as shown in FIGS. 16 to 18 represent examples of input means (user interface) for accepting a one-dimensional parameter value associated with this degree of stereoscopic effect.

Figure 16:
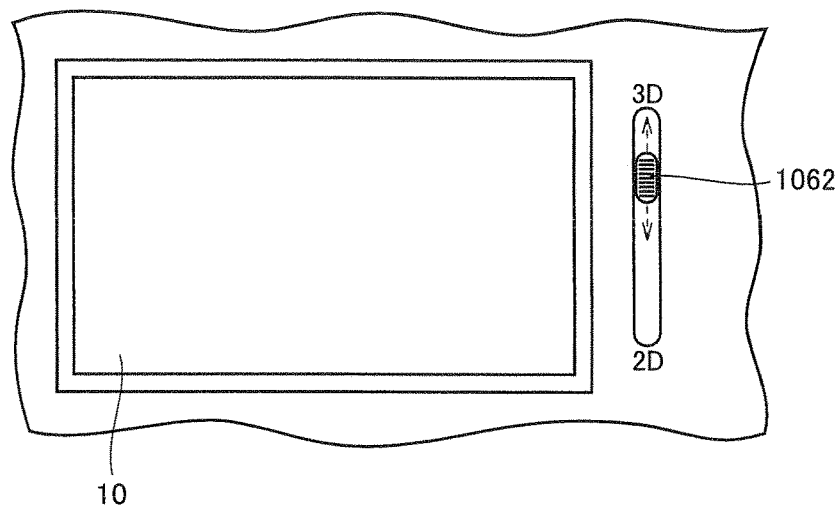
FIGS. 16 to 18 show one example of a configuration for accepting stereoscopic effect adjustment made by a user according to the present embodiment.

FIG. 16 shows a mechanism capable of accepting an indication to change stereoscopic effect in accordance with a sliding operation in a direction of a prescribed one axis (a slider 1062) by way of example of a configuration for accepting adjustment by the user of stereoscopic effect according to the present embodiment. This slider 1062 is provided on a side or the like of the display surface of display 10.

Regarding a range of adjustment by means of this mechanism (slider 1062), virtual space distance Df immediately after calculation, which is a maximum value between right virtual camera 302 and left virtual camera 304 under a given condition, preferably corresponds to the substantial maximum value of the adjustment range based on indication of stereoscopic effect by means of slider 1062.

Namely, typically, as the user adjusts slider 1062, a virtual space distance between right virtual camera 302 and left virtual camera 304 varies from the maximum value "Df" (or a value in the vicinity of Df) to a minimum value "0". In other words, setting is made such that virtual space distance Df between right virtual camera 302 and left virtual camera 304 initially set by library for stereoscopic display 218 corresponds to the maximum value (the uppermost portion on the sheet surface) in a range of adjustment by slider 1062 and such that "0" corresponds to the minimum value (the lowermost portion on the sheet surface) in the range of adjustment by slider 1062. Namely, assuming an adjustment value given by slider 1062 as γ, virtual space distance Df' after adjustment of stereoscopic effect can be expressed in the following expression.

Virtual space distance Df'=Virtual space distance Df(maximum value)×Adjustment value γ (0≤γ≤1)

It is noted that virtual space distance Df (maximum value) between right virtual camera 302 and left virtual camera 304 may completely unmatch with the maximum value of the range of adjustment by slider 1062. For example, a value obtained by multiplying virtual space distance Df (maximum value) by a prescribed constant α (0<α<1) may be brought in correspondence with the maximum value of the range of adjustment by slider 1062. In this case, assuming an adjustment value given by slider 1062 as γ, virtual space distance Df' after adjustment of stereoscopic effect can be expressed in the following expression.

Virtual space distance Df'=Constant α×Virtual space distance Df (maximum value)×Adjustment value γ (0≤γ≤1)

It is noted that two-dimensional display instead of stereoscopic display is provided on display 10 when the virtual space distance between right virtual camera 302 and left virtual camera 304 is set to "0". Therefore, slider 1062 shown in FIG. 16 is labeled with a character "3D" indicating stereoscopic display, in a direction upward on the sheet surface, and a character "2D" indicating two-dimensional display is provided in a direction downward on the sheet surface. Namely, when the user moves slider 1062 to the position of "3D", the maximum virtual space distance is set. On the other hand, when the user moves slider 1062 to the position of "2D", the virtual space distance is set to "0".

In response to such a user's operation of slider 1062, at least one of arrangement positions of right virtual camera 302 and left virtual camera 304 set in the processing as described above is changed. Then, when the position(s) of right virtual camera 302 and/or left virtual camera 304 is (are) changed, the field(s) of view (view volume(s)) of right virtual camera 302 and/or left virtual camera 304 is (are) also set again.

Figure 17:
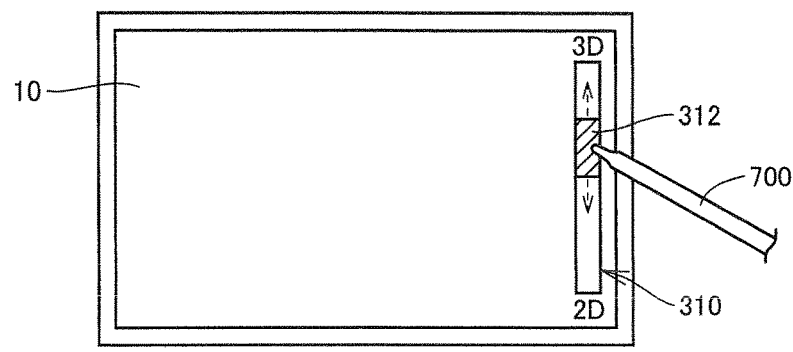

FIG. 17 shows a user interface in a case where display 10 is implemented as a touch panel by way of another example of a configuration for accepting adjustment by the user of stereoscopic effect according to the present embodiment. In this user interface as well, an image object 310 along a direction of a prescribed one axis similar to the slider shown in FIG. 16 above and an image object 312 displayed to move relatively to this image object 310 are displayed. As the user touches display 10 using a touch pen (stylus pen) 700 or the like, this image object 312 moves in accordance with the user's touch operation. Then, an indication in accordance with the position of this image object 312 is generated.

Figure 18:
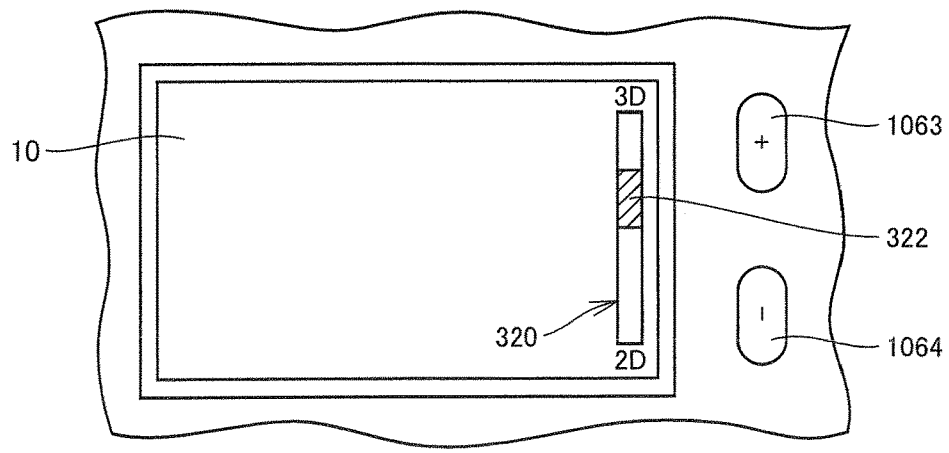

FIG. 18 shows a user interface using display 10 and an operation button by way of yet another example of a configuration for accepting adjustment by the user of stereoscopic effect according to the present embodiment. In this user interface as well, an image object 320 along a direction of a prescribed one axis similar to the slider shown in FIG. 16 above and an image object 322 displayed to move relatively to this image object 320 are displayed. As the user presses the operation button provided on information processing system 1 (a+button 1063 and a−button 1064), this image object 322 moves, Then, an indication in accordance with the position of this image object 322 is generated.

[c5. Return Value]

Referring again to FIG. 7, library for stereoscopic display 218 not only calculates respective setting values for right virtual camera 302 and left virtual camera 304 but also returns a value indicating a result of prescribed processing to an application or the like as a return value. In the present embodiment, library for stereoscopic display 218 returns information indicating positional relation between right virtual camera 302 and left virtual camera 304 as a return value. In the description below, a processing example where virtual space distance Df between right virtual camera 302 and left virtual camera 304 within the three-dimensional virtual space is used will be described by way of typical example of this positional relation.

This virtual space distance Df corresponds to an amount of parallax for a subject image corresponding to an object within the right image and the left image generated when the object located at infinity within the three-dimensional virtual space is virtually photographed by right virtual camera 302 and left virtual camera 304, which can be explained as follows. When viewed from right virtual camera 302 and left virtual camera 304, the object located at infinity looks like present on a straight line extending from each virtual camera position in a virtual camera direction. Therefore, when a certain object located at infinity is viewed from the right virtual camera and when the same object is viewed from the left virtual camera, the object located at infinity looks like present right in front of each virtual camera. Therefore, by rendering the object such that the object is seen as if it were present right in front of each virtual camera, it can be expressed as the object located at infinity. In order to show the object as if it were located right in front of each virtual camera, it is only necessary to generate and display images having an amount of parallax corresponding to a distance between the virtual cameras. It is noted that parallax generated for an object located at any position between right virtual camera 302, left virtual camera 304 and infinity is smaller than parallax generated for the object located at infinity (virtual space distance Df).

Therefore, by displaying on display 10 such a pair of images that difference in position of appearance of the subject image for the same object represented therein is of magnitude corresponding to virtual space distance Df, the subject image can visually be recognized as being located on the rearmost side when viewed from the user. In other words, by generating a right image to be displayed as a background (hereinafter also referred to as a "right background image") and a left image to be displayed as a background (hereinafter also referred to as a "left background image") having appropriate parallax in coordination with virtual space distance Df between right virtual camera 302 and left virtual camera 304, the background image can always be displayed on the rear side relative to any object even when a degree of stereoscopic effect on display 10 is varied.

Virtual space distance Df described above represents a virtual space distance in a three-dimensional space of interest, and it has a unit system different from an actual size of the display surface of display 10. Therefore, in order to be able to readily determine how much amount of parallax should be generated between the right background image and the left background image on the display surface of display 10, a standardized, dimensionless value is preferably used as a return value.

In the present embodiment, a ratio standardized with a rendering range displayed on display 10 serving as the reference is used as such a dimensionless value. More specifically, library for stereoscopic display 218 outputs as a return value, a ratio of virtual space distance Df between right virtual camera 302 and left virtual camera 304, with a width of the reference virtual plane region (see FIG. 2) included in the view volume of reference virtual camera 300, which is a virtual plane perpendicular to camera direction 301 of reference virtual camera 300, serving as the reference.

Namely, since the reference virtual plane region corresponds to a range rendered on the display surface of display 10, a ratio of virtual space distance Df to a width of the reference virtual plane region matches with a ratio of an actual amount of parallax to be generated between the right background image and the left background image to an actual screen width of display 10. Therefore, by adopting the ratio of virtual space distance Df to the width of the reference virtual plane region as the return value, an amount of parallax to be generated between the right background image and the left background image, that are pictures located on the rearmost side when viewed from the user, can readily be determined in accordance with an actual screen width of display 10.

As described above, the return value from library for stereoscopic display 218 corresponds to the ratio of virtual space distance Df between right virtual camera 302 and left virtual camera 304, with the width of the reference virtual plane region within the three-dimensional virtual space serving as the reference.

Figure 19:
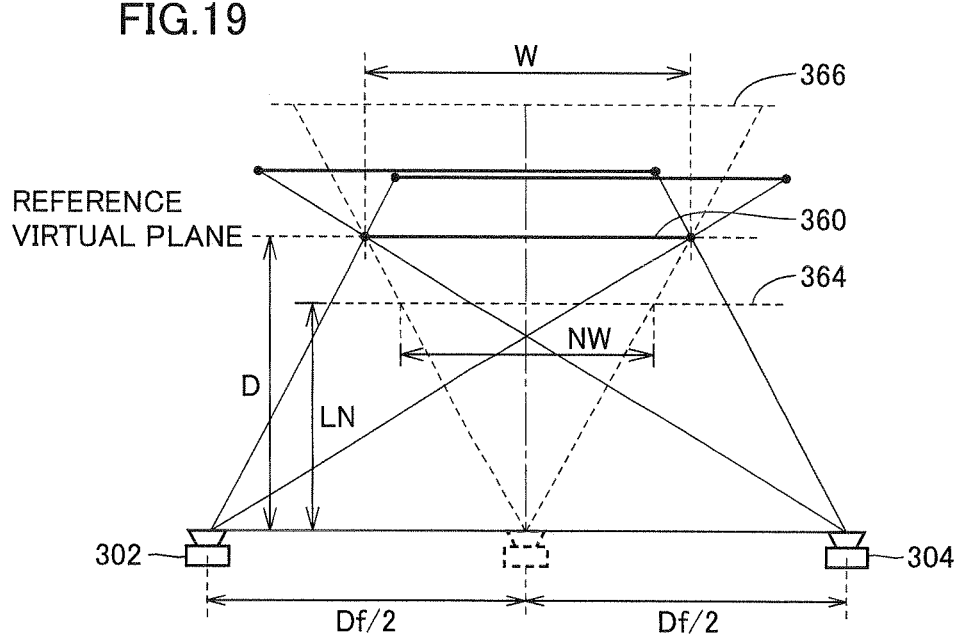
FIG. 19 is a diagram for illustrating processing for calculating a return value in the library for stereoscopic display according to the present embodiment.

Referring to FIG. 19, a return value RV is calculated as: return value RV=(virtual space distance Df between right virtual camera 302 and left virtual camera 304/virtual space distance W corresponding to the width of reference virtual plane region 360). Here, virtual space distance W can be expressed as follows, by using a virtual space distance LN from reference virtual camera 300 to near clipping plane 364, virtual space distance D from reference virtual camera 300 to the reference virtual plane, and a virtual space distance NW corresponding to a width of near clipping plane 364.

Virtual space distance W=Virtual space distance NW×Virtual space distance D/Virtual space distance LN Therefore, return value RV can be calculated as below.

Return value RV={Virtual space distance Df/(Virtual space distance NW×Virtual space distance D/Virtual space distance LN)}

Among these parameters, virtual space distance NW and virtual space distance LN are calculated based on (1) reference virtual camera information (see FIG. 7) input to library for stereoscopic display 218, and virtual space distance D is calculated based on (2) reference virtual plane information input to library for stereoscopic display 218. In addition, virtual space distance Df is determined as a result of processing for setting right virtual camera 302 and left virtual camera 304, as described above.

Return value RV described above indicates a degree of displacement at the display surface of display 10 when an object at infinity is photographed by right virtual camera 302 and left virtual camera 304 set within the three-dimensional virtual space. For example, in an example where a far landscape is rendered in one image, the image representing this far landscape can be expressed as a picture located in the rearmost part by displacing the right image output by right virtual camera 302 by (a lateral width of the display surface× return value (%)) toward the right and displacing the left image output by left virtual camera 304 by the lateral width of the display surface×return value toward the left.

[c7. Variation Involved With Library for Stereoscopic Display]

In the example shown in FIGS. 12A to 12C above, an example where parallax assessment plane 361 is set at any position between near clipping plane 364 and far clipping plane 366 has been shown. By way of example, library for stereoscopic display 218 shown in FIG. 7 defines parallax assessment plane 361 as shown in FIG. 12A by using virtual space distance A from reference virtual plane region 360 ((3) parallax assessment plane information).

In contrast, a position where parallax assessment plane 361 is to be set may be set in advance. For example, parallax assessment plane 361 may be set so as to match with far clipping plane 366. Namely, an amount of parallax generated between a right object image and a left object image may be evaluated at far clipping plane 366.

Thus, if parallax assessment plane 361 is caused to match with far clipping plane 366, an amount of parallax in a plane located on the rearmost side within a rendered range in a virtual space is to be evaluated. Therefore, it can be guaranteed that parallax exceeding the parallax limit amount is not generated for any object present within a range to be rendered.

Namely, parallax assessment plane 361 for evaluating an amount of parallax generated between the right image generated by the right virtual camera and the left image generated by the left virtual camera is set at a position farthest from the reference virtual camera in the view volumes of the both virtual cameras.

In such a case, it is not necessary to input (3) parallax assessment plane information to the library for stereoscopic display, because, namely, simply by setting far clipping plane 366 with the use of at least (1) reference virtual camera information, parallax assessment plane 361 can automatically be set.

If parallax assessment plane 361 is set to match with far clipping plane 366, a library for stereoscopic display 218# as shown in FIG. 20 may be used. In library for stereoscopic display 218# shown in this FIG. 20, input of (3) parallax assessment plane information is omitted (or an invalid value "null" is input). Since information provided to library for stereoscopic display 218# can thus be decreased, simplification and higher speed of processing can be achieved.

An alternative configuration may also be designed so as to have input factors as many as those in library for stereoscopic display 218 shown in FIG. 7. In this case, in the "application-priority mode" as well, information corresponding to (3') reference degree of stereoscopic effect may be accepted. Typically, library for stereoscopic display 218# accepts input of a reference degree of stereoscopic effect, which is a coefficient taking a value from "0" to "1", and adjusts virtual space distance Df between the virtual cameras (see FIG. 9). More specifically, it is used for processing for further correction of virtual space distance Df (or return value RV) calculated in accordance with the procedure as described above. Namely, library for stereoscopic display 218# is configured to be able to accept a parameter for realizing a function to adjust stereoscopic effect as shown in FIGS. 16 to 18.

By adopting such a mechanism, stereoscopic effect can supplementarily be adjusted also in the "application-priority mode."

<D. Processing Procedure>

Processing contents of the program according to the present embodiment will now be described with reference to FIGS. 21 and 22. It is noted that each step shown in FIGS. 21 and 22 is typically provided by execution of the program by CPU 100 of information processing system 1.

(d1. Main Routine)

In the flowchart shown in FIG. 21, processing in a case where stereoscopic display is provided on display 10 by designating a parameter as in two-dimensional display of an object within a three-dimensional virtual space on display 10 as shown in FIG. 1A as the application proceeds will be described.

Figure 21:
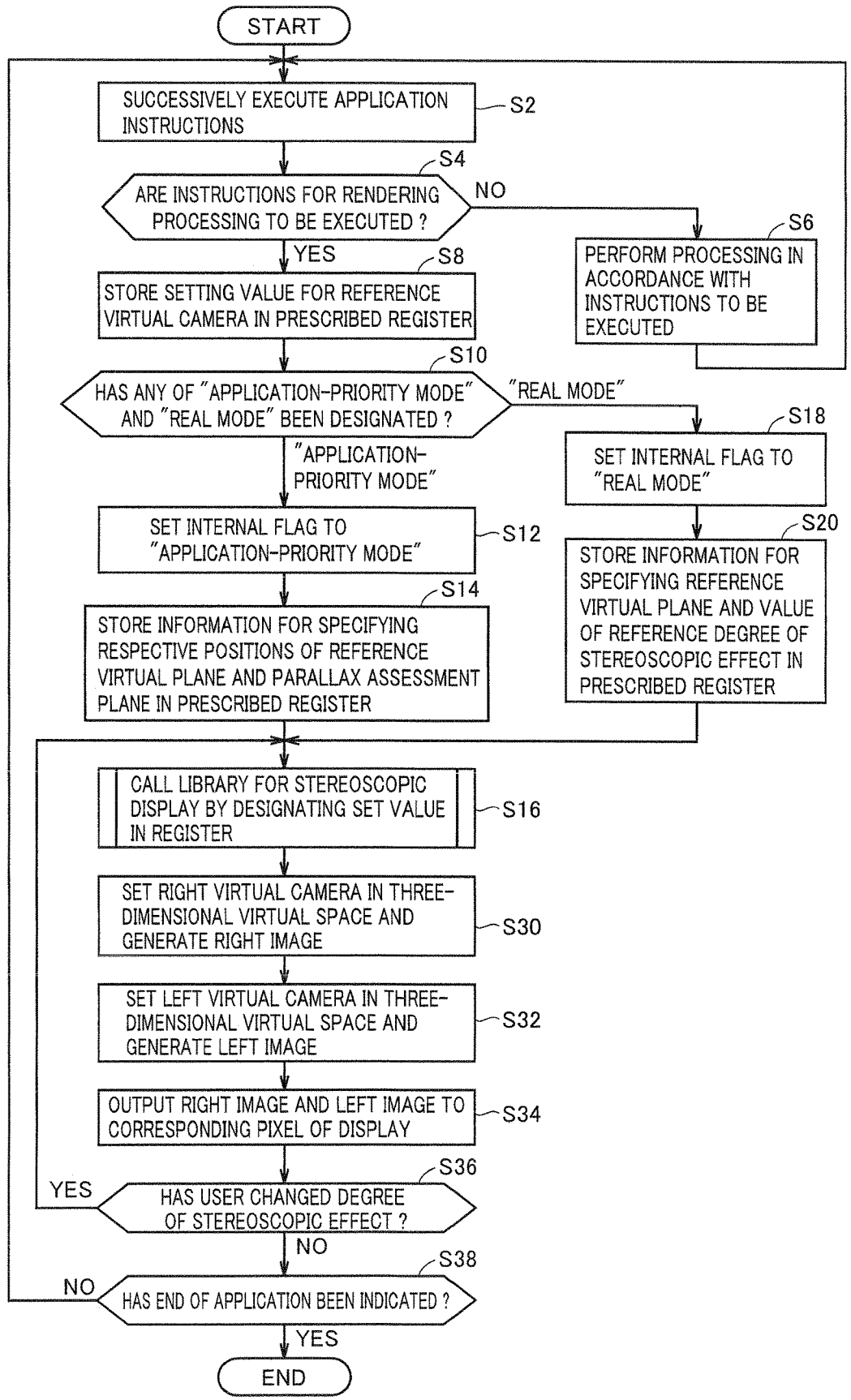
FIG. 21 is a flowchart showing a main routine of the program according to the present embodiment.
Figure 22:
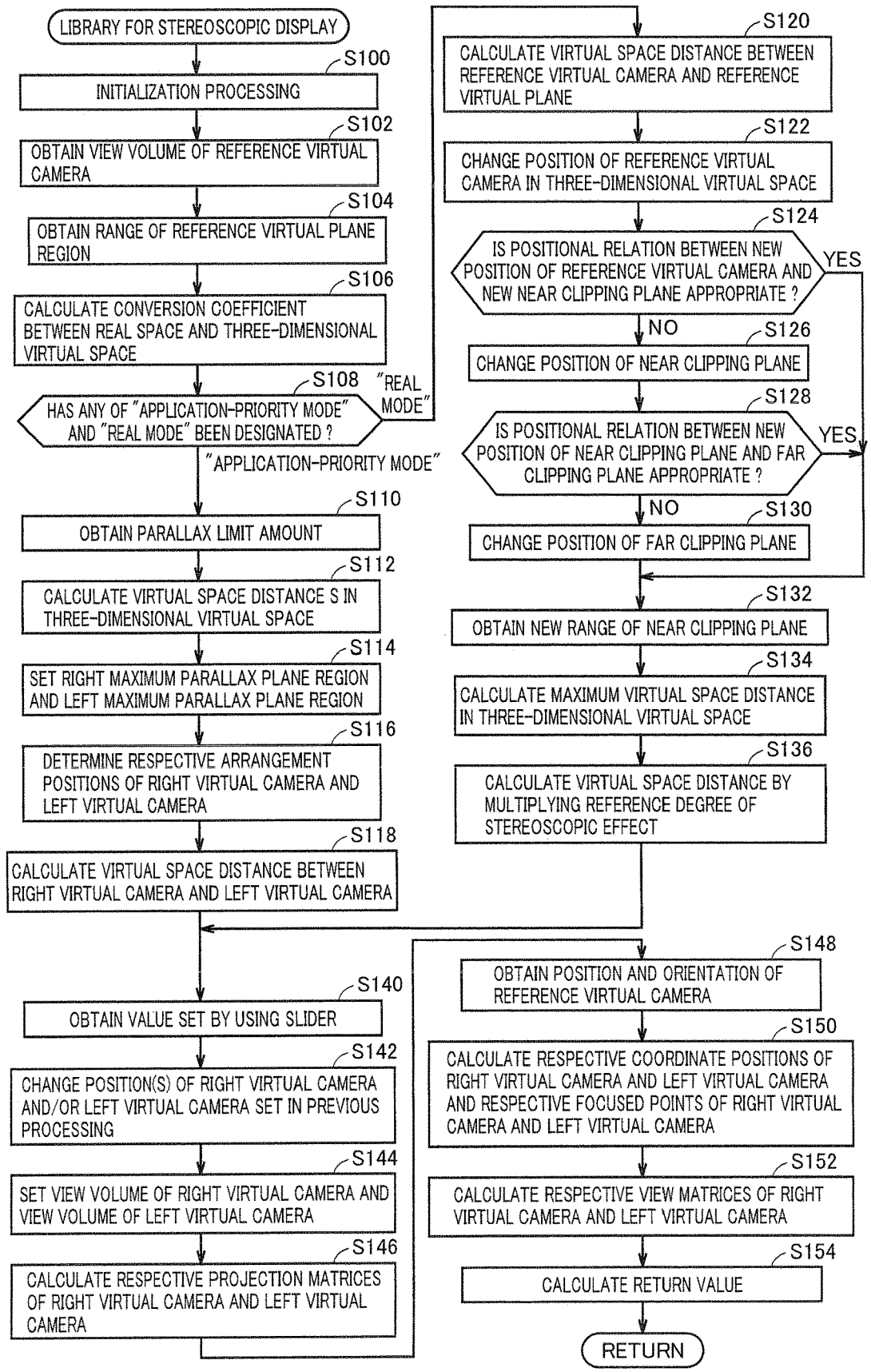
FIG. 22 is a flowchart showing the library for stereoscopic display according to the present embodiment.

Referring to FIG. 21, CPU 100 successively executes application instructions described in the program (step S2). Namely, proceeding module 204 shown in FIGS. 6A and 6B proceeds with the application in accordance with an internal command or the like generated by input module 202 or the like.

When instructions for rendering processing to display 10 are to be executed (YES in step S4), CPU 100 performs processing in step S8 and subsequent steps. In contrast, when instructions of interest are other than the rendering processing to display 10 (NO in step S4), CPU 100 performs processing in accordance with the instructions to be executed (step S6). Thereafter, the process returns to step S2.

In step S8, CPU 100 causes a prescribed register to store a setting value (an arrangement position and a view volume) for the reference virtual camera (reference virtual camera 300 shown in FIG. 1B) designated as the application proceeds. It is noted that a camera matrix (a projection matrix and a view matrix) is employed as the setting value for the reference virtual camera. Namely, in step S8, (1) reference virtual camera information shown in FIG. 7 is designated.

In successive step S10, CPU 100 determines which of the "application-priority mode" and the "real mode" has been designated. This mode is designated in accordance with intention of the creator of the application, the user's operation or the like.

When the "application-priority mode" has been designated (in the case of "application-priority" in step S10), CPU 100 sets an internal flag to the "application-priority mode" (step S12). Namely, (4) mode information shown in FIG. 7 is set. In succession, CPU 100 causes a prescribed register to store information for specifying respective positions of the reference virtual plane (corresponding to reference virtual plane region 360 shown in FIGS. 12A to 12C and 13A to 13D) and the parallax assessment plane (parallax assessment plane 361 shown in FIGS. 12A to 12C and 13A to 13D) in the three-dimensional virtual space displayed as the application proceeds (step S14). Namely, (2) reference virtual plane information and (3) parallax assessment plane information shown in FIG. 7 are designated. When library for stereoscopic display 218# (FIG. 20) is called in step S16 which will be described later, designation of (3) parallax assessment plane information may be skipped.

In addition, CPU 100 designates a value in the register set in steps S8 and S12 and calls library for stereoscopic display 218 (or library for stereoscopic display 218#) for setting the right virtual camera and the left virtual camera (step S16).

In contrast, when the "real mode" has been designated (in the case of the "real mode" in step S10), CPU 100 sets the internal flag to the "real mode" (step S18), Namely, (4) mode information shown in FIG. 7 is set. In succession, CPU 100 causes a prescribed register to store information for specifying the reference virtual plane where a display target in the three-dimensional virtual space to desirably be visually recognized is present (corresponding to reference virtual plane region 360 shown in FIGS. 12A to 12C and 13A to 13D) and a value of a reference degree of stereoscopic effect (step S20). Namely, (2) reference virtual plane information and (3') reference degree of stereoscopic effect shown in FIG. 7 are designated. In addition, CPU 100 designates a value in the register set in steps S8 and S18 and calls library for stereoscopic display 218 (or library for stereoscopic display 218#) for setting the right virtual camera and the left virtual camera (step S16).

Though processing in library for stereoscopic display 218 (library for stereoscopic display 218#) in step S16 will be described in detail with reference to FIG. 22, by calling library for stereoscopic display 218, CPU 100 calculates a camera matrix (a projection matrix and a view matrix) of the right virtual camera and a camera matrix (a projection matrix and a view matrix) of the left virtual camera as well as the return value (a ratio of a distance between right virtual camera 302 and left virtual camera 304 with the width of the reference virtual plane region (see FIG. 2) for reference virtual camera 300 serving as the reference).

In successive step S30, CPU 100 sets the right virtual camera (right virtual camera 302 shown in FIG. 1B) in the three-dimensional virtual space in accordance with the camera matrix calculated by library for stereoscopic display 218 (or library for stereoscopic display 218#), and generates a right image based on virtual photographing by the right virtual camera. In addition, in step S32, CPU 100 sets the left virtual camera (left virtual camera 304 shown in FIG. 1B) in the three-dimensional virtual space based on the calculated camera matrix and generates a left image based on virtual photographing by the left virtual camera.

Namely, in steps S30 and S32 described above, image rendering module 206 shown in FIGS. 6A and 6B generates (renders) the right image and the left image with reference to object definition data 208, in accordance with a result of calculation by library for stereoscopic display 218 (library for stereoscopic display 218#).

Finally, in step S34, CPU 100 outputs the right image and the left image generated in steps S30 and S32 to a corresponding pixel of display 10.

Thereafter, CPU 100 determines whether the user has operated the slider or the like as shown in FIGS. 16 to 18 so as to change the degree of stereoscopic effect or not (step S36). When the degree of stereoscopic effect has been changed (YES in step S36), the processing in step S16 is performed again.

When the degree of stereoscopic effect has not been changed (NO in step S36), CPU 100 determines whether end of the application has been indicated or not (step S38). When end of the application has not been indicated (NO in step S38), the processing in step S2 and subsequent steps is repeated. In contrast, when end of the application has been indicated (YES in step S38), the process ends.

(d2. Library for Stereoscopic Display)

Referring to FIG. 22, CPU 100 initially performs initialization processing (step S100). In this initialization processing, initial values for an actual size of the display surface of display 10, an actual interval between the user's eyes, an actual distance from the user to the display surface of display 10, a limit depth up to which the user can comfortably accept stereoscopic display, and the like are set to prescribed setting values, respectively. As a method of setting these setting values, a manner of designating an expected value registered in advance in hardware (or firmware) of display 10, a manner of designation by an application, a manner of setting by the user, and the like may be employed.

In successive step S102, CPU 100 obtains the view volume of the reference virtual camera by calculating respective ranges of the near clipping plane and the far clipping plane within the three-dimensional virtual space (values in the three-dimensional virtual space) based on the projection matrix of the reference virtual camera. In further successive step S104, CPU 100 obtains the range of the reference virtual plane region to be rendered (value in the three-dimensional virtual space) based on the projection matrix of the reference virtual camera and the positional information of the reference virtual plane. In further successive step S106, CPU 100 calculates a conversion coefficient between the real space and the three-dimensional virtual space based on a ratio between a length in a lateral direction (or a length in a vertical direction) of the reference virtual plane region in the three-dimensional virtual space and an actual screen width (or an actual screen height) of the display surface of display 10.

In successive step S108, CPU 100 determines which of the "application-priority mode" and the "real mode" has been designated. When the "application-priority mode" has been designated (in the case of the "application-priority mode" in step S108), processing in step S110 and subsequent steps is performed. Alternatively, when the "real mode" has been designated (in the case of the "real mode" in step S108), processing in step S120 and subsequent steps is performed.

In step S110, CPU 100 obtains a maximum amount of parallax (parallax limit amount) between the right image and the left image on the display surface up to which the user can comfortably accept stereoscopic display on display 10. Display is preferably provided such that the amount of parallax for the object to desirably be visually recognized by the user is equal to or smaller than this parallax limit amount. This parallax limit amount is determined by an actual screen width of the display surface of display 10, an actual interval between the user's eyes, an actual distance from the user to the display surface of display 10, and the like.

By way of example of a method of obtaining the parallax limit amount in step S110, the parallax limit amount may be calculated in advance from an expected actual screen width of the display surface of display 10, an actual interval between the user's eyes, an actual distance from the user to the display surface of display 10, and the like, and that value may be made use of. Alternatively, for example, such a method as calculating the parallax limit amount from a value obtained with other means, for example, a method of mounting an image pick-up device or the like on display 10 and measuring an actual interval between the user's eyes with the use of the image pick-up device, may be employed.

In successive step S112, CPU 100 calculates virtual space distance S in the three-dimensional virtual space (corresponding to an amount of displacement between right maximum parallax plane 362 and left maximum parallax plane 363 shown in FIGS. 12A to 12C) corresponding to the parallax limit amount, by using the conversion coefficient calculated in step S106. Namely, the parallax limit amount obtained in step S110 is a value in the real space, and in step S112, in order to perform assessment processing on the parallax assessment plane shown below, the value in the real space is converted to a value in the three-dimensional virtual space of interest.

In successive steps S114 and S116, CPU 100 determines respective arrangement positions of the right virtual camera and the left virtual camera. Namely, in step S114, CPU 100 sets the right maximum parallax plane (right maximum parallax plane 362 shown in FIGS. 12A to 12C) which is a range rendered by the right virtual camera and the left maximum parallax plane (left maximum parallax plane 363 shown in FIGS. 12A to 12C) which is a range rendered by the left virtual camera, so as to generate parallax of virtual space distance S on the parallax assessment plane in the three-dimensional virtual space.

When (3) parallax assessment plane information is input, the parallax assessment plane is set with the reference virtual plane region serving as the reference, and when (3) parallax assessment plane information is not input, it is set at the position of the far clipping plane.

In successive step S116, CPU 100 determines respective arrangement positions of the right virtual camera and the left virtual camera based on the reference virtual plane region obtained in step S104 as well as on the right maximum parallax plane and the left maximum parallax plane set in step S114. More specifically, CPU 100 sets the right virtual camera at a position where the view volume including the reference virtual plane region and the right maximum parallax plane can be defined and sets the left virtual camera at a position where the view volume including the reference virtual plane region and the left maximum parallax plane can be defined. It is noted that the right virtual camera and the left virtual camera are arranged on the reference line passing through the reference virtual camera and extending in parallel to the reference virtual plane. Namely, CPU 100 determines respective positions of the right virtual camera and the left virtual camera by moving the reference virtual camera along the reference line by a prescribed distance.

In successive step S118, CPU 100 calculates virtual space distance Df between the right virtual camera and the left virtual camera determined in step S116. Then, the process proceeds to step S140.

In step S120, CPU 100 calculates virtual space distance D' between the reference virtual camera and the reference virtual plane in the three-dimensional virtual space so as to correspond to real positional relation between display 10 and the user (see FIG. 15C). More specifically, CPU 100 calculates new virtual space distance D' from the reference virtual camera to the reference virtual plane (see FIG. 15C) by multiplying a distance expected as an actual distance from the user to the display surface of display 10 (actual distance L1 shown in FIG. 15A) by the conversion coefficient calculated in step S106. In the real mode, the position of the virtual camera is set such that positional relation between the reference virtual plane region and the virtual camera matches with the positional relation between the display surface of display 10 and the user's eyes. Namely, CPU 100 sets virtual space distance D' such that the ratio between virtual space distance D' and the distance from the user to the display surface of display 10 matches with a ratio between width W of the reference virtual plane region (see FIG. 15B) and actual screen width L3 of display 10 (see FIG. 15A).

In successive step S122, CPU 100 changes the position of the reference virtual camera in the three-dimensional virtual space, based on new virtual space distance D' calculated in step S120 (see FIG. 15C). CPU 100 changes relative positional relation between the reference virtual camera and the near clipping plane, the far clipping plane as the position of this reference virtual camera is changed.

In step S124, CPU 100 determines whether positional relation between the new position of the reference virtual camera and the near clipping plane is appropriate or not. This is because the near clipping plane may be located on the side opposite to the camera direction of the reference virtual camera as a result of movement of the reference virtual camera toward the near clipping plane.

When the positional relation between the new position of the reference virtual camera and the near clipping plane is not appropriate (NO in step S124), CPU 100 changes the position of the near clipping plane (step S126). In further successive step S128, CPU 100 determines whether positional relation between the new position of the near clipping plane and the far clipping plane is appropriate or not (step S128). This is because the near clipping plane may be located beyond the far clipping plane as a result of change in the position of the near clipping plane.

When the positional relation between the new position of the near clipping plane and the far clipping plane is not appropriate (NO in step S128), CPU 100 changes the position of the far clipping plane (step S130).

Thereafter, in step S132, CPU 100 obtains a new range of the near clipping plane (value in the three-dimensional virtual space).

In successive step S134, CPU 100 calculates a maximum virtual space distance between the right virtual camera and the left virtual camera in a case where stereoscopic display close to real is provided. More specifically, the maximum virtual space distance in the three-dimensional virtual space is calculated by multiplying the actual interval between the user's eyes by the conversion coefficient calculated in step S106. In further successive step S136, CPU 100 calculates virtual space distance Df between right virtual camera 302 and left virtual camera 304 by multiplying the calculated maximum virtual space distance by (3') reference degree of stereoscopic effect designated when library for stereoscopic display 218 is called. Thus, respective positions of the right virtual camera and the left virtual camera are determined. Then, the process proceeds to step S140.

In step S140, CPU 100 obtains a setting value set with the slider as shown in FIGS. 16 to 18 (typically, a value in a range from 0 to 100%). In further successive step S142, CPU 100 changes the position(s) of the right virtual camera and/or the left virtual camera set in the previous processing, in accordance with the new virtual space distance obtained by multiplying virtual space distance Df by the setting value obtained in step S140.

In successive step S144, CPU 100 sets the view volume of the right virtual camera and the view volume of the left virtual camera, so as to maintain the range of the reference virtual plane region included in the view volume of the reference virtual camera. In further successive step S146, CPU 100 calculates a projection matrix of the right virtual camera and a projection matrix of the left virtual camera representing the respective view volumes of the set virtual cameras.

In successive step S148, CPU 100 obtains a position and an orientation of the reference virtual camera based on a view matrix of the reference virtual camera. In further successive step S150, CPU 100 calculates respective coordinate positions of the right virtual camera and the left virtual camera and respective focused points of the right virtual camera and the left virtual camera based on virtual space distance Df calculated in the previous processing. In further successive step S152, CPU 100 calculates respective view matrices of the right virtual camera and the left virtual camera based on the parameter calculated in step S150.

In successive step S154, CPU 100 calculates return value RV. Namely, CPU 100 calculates a ratio of the virtual space distance between the right virtual camera and the left virtual camera, with the virtual space distance corresponding to the width of the reference virtual plane region serving as the reference.

Thereafter, the process returns.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium encoded with a computer-readable display control program and executable by a computer for controlling a display capable of providing stereoscopic display, the computer-readable display control program comprising:
    first virtual camera setting instructions for setting a reference virtual camera, and
    second virtual camera setting instructions automatically setting, based on the setting of the reference virtual camera, respective positions and directions of a right virtual camera and a left virtual camera for virtual photographing in the virtual space, the right virtual camera and the left virtual camera being configured to generate a right image and a left image, respectively, for providing stereoscopic display, on the display, of an image expressing the virtual space, wherein
    the second virtual camera setting instructions are adapted to set the right virtual camera and the left virtual camera such that the respective positions of the right and left virtual cameras are different from the position of the reference virtual camera, the camera directions of the right virtual camera and the left virtual camera are oriented in an identical direction corresponding to a camera direction of the reference virtual camera and the identical direction is perpendicular to a straight line passing through the positions of both of the right and left virtual cameras, and
    the computer-readable display control program further comprises first information output instructions for outputting information including distance information relating to a distance between the right virtual camera and the left virtual camera, the distance information including a return value based on a ratio of a distance between the right virtual camera and the left virtual camera corresponding to an amount of parallax for an object at infinity in the virtual space, and a width of a reference virtual plane region of a reference virtual plane corresponding to a display surface of the display, the return value being usable by an application executed by the computer for positioning an object at a rear-most side, relative to the right and left virtual cameras, of a stereoscopic image expressing the virtual space.

2. The non-transitory storage medium according to claim 1, wherein the first virtual camera setting instructions are adapted to set the reference virtual camera based on, designation of a position, within a three-dimensional virtual space, of the reference virtual plane, the reference virtual plane region corresponding to a cross-section of a view volume of the reference virtual camera at the reference virtual plane.

3. The non-transitory storage medium according to claim 1, wherein the computer-readable display control program further comprises view volume setting instructions for setting respective view volumes of the right and left virtual cameras, the view volume setting instructions being adapted to set the view volumes such that the view volumes of the right virtual camera and the left virtual camera are fully coextensive at a position of the reference virtual plane region.

4. The non-transitory storage medium according to claim 1, wherein
    the second virtual camera setting instructions are adapted to set the right virtual camera and the left virtual camera on a straight line passing through the positions of the reference virtual camera, the right virtual camera and left virtual camera such that the right virtual camera and left virtual camera are apart from the reference camera by an identical distance in opposite directions on the straight line.

5. The non-transitory storage medium according to claim 4, wherein
    the second virtual camera setting instructions are adapted to:
    set the right virtual camera at a position resulting from movement of an arrangement position of the reference virtual camera toward right along a direction perpendicular to the camera direction of the reference camera, and
    set the left virtual camera at a position resulting from movement of an arrangement position of the reference virtual camera toward left along the direction perpendicular to the camera direction of the reference camera.

6. The non-transitory storage medium according to claim 5, wherein
    the second virtual camera setting instructions are adapted to set the right virtual camera at the position resulting from movement of the arrangement position of the reference virtual camera toward right by a prescribed distance along the direction perpendicular to the reference camera direction and to set the left virtual camera at the position resulting from movement of the arrangement position of the reference virtual camera toward left by the prescribed distance along the direction perpendicular to the reference camera direction.

7. The non-transitory storage medium according to claim 1, wherein the computer-readable display control program further comprises:
    view volume setting instructions adapted to set the respective view volumes of the right and left virtual cameras such that the view volume of each of the right and left virtual cameras extends asymmetrically with respect to a line extending from the position of a corresponding virtual camera in the camera direction, toward a side where the other virtual cameras is present.

8. The non-transitory storage medium according to claim 1, wherein the second virtual camera setting instructions are adapted to set the respective positions and directions of the left and right virtual cameras such that an object located in the virtual space on the reference virtual plane region is displayed substantially without parallax on the display surface of the display and so that another object located in the virtual space other than on the reference virtual plane region is displayed with a parallax that varies, up to a parallax limit amount, in dependence on a distance of the other object from the reference virtual plane region.

9. The non-transitory storage medium according to claim 1, wherein the computer-readable display control program further comprises view volume setting instructions adapted to set the respective view volumes of the right and left virtual cameras by using a near clipping plane and a far clipping plane of the view volume of the reference virtual camera.

10. The non-transitory storage medium according to claim 1, wherein
the computer-readable display control program further comprises second information output instructions for outputting information indicating respective view volumes of the right and left virtual cameras, that are set as a result of execution of view volume setting instructions.

11. The non-transitory storage medium according to claim 1, wherein the computer-readable display control program comprises a program encoded as a library.

12. The non-transitory storage medium according to claim 1, wherein the computer-readable display control program further comprises:
view volume setting instructions adapted to set a view volume of the right virtual camera extending asymmetrically and a view volume of the left virtual camera extending asymmetrically such that they extend toward one side, in a manner symmetric with respect to each other.

13. The non-transitory storage medium according to claim 1, wherein
the computer-readable display control program is adapted to accept information for designating a position of a parallax assessment plane in parallel to the reference virtual plane region, for evaluating an amount of parallax produced between the right image generated by the right virtual camera and the left image generated by the left virtual camera.

14. The non-transitory storage medium according to claim 12, wherein
the computer-readable display control program is adapted to set a parallax assessment plane in parallel to the reference virtual plane region, for evaluating an amount of parallax produced between the right image generated by the right virtual camera and the left image generated by the left virtual camera, at a position farthest from the reference virtual camera in the view volumes of the respective virtual cameras.

15. The non-transitory storage medium according to claim 14, wherein
the parallax assessment plane is provided on a side opposite to the reference virtual camera, with respect to the reference virtual plane region.

16. The non-transitory storage medium according to claim 1, wherein the second virtual camera setting instructions include maximum distance determination instructions for determining a tolerable maximum distance, corresponding to a parallax limit amount, between the right virtual camera and the left virtual camera.

17. The non-transitory storage medium according to claim 16, wherein
the computer-readable display control program further comprises mode setting instructions for setting any of first and second modes, and
the second virtual camera setting instructions further comprises instructions for setting the right virtual camera and the left virtual camera such that an amount of parallax produced between the right image generated by the right virtual camera and the left image generated by the left virtual camera does not exceed a predetermined value, corresponding to the parallax limit amount, when the first mode is set, and instructions for setting the right virtual camera and the left virtual camera such that a distance from the reference virtual plane region to the right virtual camera and the left virtual camera is set to a predetermined value when the second mode is set.

18. The non-transitory storage medium according to claim 1, wherein
the computer-readable display control program further comprises change acceptance instructions for changing at least one of the position of the right virtual camera and the position of the left virtual camera automatically set as a result of execution of the virtual camera setting instructions, based on an indication to change parallax.

19. The non-transitory storage medium according to claim 18, wherein the computer-readable display control program further comprises:
view volume setting instructions adapted to change respective view volumes of the right virtual camera and the left virtual camera when the position of the right virtual camera or the position of the left virtual camera is changed as a result of execution of the change acceptance instructions.

20. The non-transitory storage medium according to claim 18, wherein the change acceptance instructions are adapted to accept the indication to change parallax in accordance with a sliding operation along a prescribed one axis direction.

21. The non-transitory storage medium according to claim 18, wherein
the change acceptance instructions are adapted to bring the distance between the right virtual camera and the left virtual camera automatically set as a result of execution of the virtual camera setting instructions into correspondence with a substantially maximum value of an adjustment range, corresponding to a parallax limit amount, based on the indication of parallax.

22. A system comprising:
a stereoscopic display device; and
a processing system for executing the display control program on the non-transitory storage medium according to claim 1.

23. The system according to claim 22, embodied as a portable telephone.

24. An information processing system, comprising:
a display capable of providing stereoscopic display; and
a first virtual camera setting unit, implemented by processing circuitry, for setting a reference virtual camera, and
a second virtual camera setting unit, implemented by processing circuitry, for automatically setting, based on the setting of the reference virtual camera, respective positions and directions of a right virtual camera and a left virtual camera for virtual photographing in the virtual space, the right virtual camera and the left virtual camera being configured to generate a right image and a left image, respectively, for providing stereoscopic display, on the display, of an image expressing the virtual space, wherein
the second virtual camera setting unit is adapted to set the right virtual camera and the left virtual camera such that the respective positions of the right and left virtual cameras are different from the position of the reference virtual camera, camera directions of the right virtual camera and the left virtual camera are oriented in an identical direction corresponding to a camera direction of the reference virtual camera, and the identical direction is perpendicular to a straight line passing through the positions of both of the right and left virtual cameras, and the information processing system further comprises a first information output unit, implemented by processing circuitry, for outputting information including distance information relating to a distance between the right virtual camera and the left virtual camera, the distance information including a return value based on a ratio of a distance between the right virtual camera and the left virtual camera corresponding to an amount of parallax for an object at infinity in the virtual space, and a width of a reference virtual plane region of a reference virtual plane corresponding to a display surface of the display, the return value being usable by an application executed by the image processing system for positioning an object at a rear-most side, relative to the right and left virtual cameras, of a stereoscopic image expressing the virtual space.

25. The information processing system according to claim 24, wherein the first virtual camera setting unit is adapted to set the reference virtual camera based on, designation of a position, within a three-dimensional virtual space, of the reference virtual plane, the reference virtual plane region corresponding to a cross-section of a view volume of the reference virtual camera at the reference virtual plane.

26. The information processing system according to claim 24, further comprising a view volume setting unit, implemented by processing circuitry, for setting respective view volumes of the right and left virtual cameras, the view volume setting instructions being adapted to set the view volumes such that the view volumes of the right virtual camera and the left virtual camera are fully coextensive at a position of the reference virtual plane region.

* * * * *